(12) United States Patent
Mizote

(10) Patent No.: US 10,160,562 B2
(45) Date of Patent: Dec. 25, 2018

(54) SPOUT HOLDING DEVICE, SPOUT SUPPLY MECHANISM, AND SPOUT SEAL MACHINE

(71) Applicant: TOYO JIDOKI CO., LTD., Tokyo (JP)

(72) Inventor: Kiyokazu Mizote, Iwakuni-shi, Yamaguchi-ken (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days.

(21) Appl. No.: 15/443,676

(22) Filed: Feb. 27, 2017

(65) Prior Publication Data

US 2017/0253357 A1  Sep. 7, 2017

(30) Foreign Application Priority Data

Mar. 4, 2016  (JP) ................................. 2016-042591

(51) Int. Cl.
| | | |
|---|---|---|
| *B23Q 7/04* | (2006.01) | |
| *B65G 59/00* | (2006.01) | |
| *B65H 3/00* | (2006.01) | |
| *G07F 11/16* | (2006.01) | |
| *B65B 43/26* | (2006.01) | |
| *B65B 61/18* | (2006.01) | |
| *B25J 15/00* | (2006.01) | |
| *B65B 21/12* | (2006.01) | |
| *B65G 47/90* | (2006.01) | |

(Continued)

(52) U.S. Cl.
CPC ........... *B65B 43/26* (2013.01); *B25J 15/0038* (2013.01); *B25J 15/0047* (2013.01); *B65B 21/12* (2013.01); *B65B 61/186* (2013.01); *B65G 47/908* (2013.01); *B31B 70/844* (2017.08); *B65D 75/5872* (2013.01)

(58) Field of Classification Search
CPC ....... B65B 43/26; B65B 21/12; B65B 61/186; B25J 15/0038; B25J 15/0047; B65G 47/908; B31B 70/844; B65D 75/5872
USPC ........................................................ 221/210
See application file for complete search history.

(56) References Cited

U.S. PATENT DOCUMENTS 3,086,805 A * 4/1963 Dardaine ................ B65B 21/12
294/100
3,856,343 A * 12/1974 Muller ..................... B65B 21/12
294/119.3

(Continued)

FOREIGN PATENT DOCUMENTS

| JP | 63-196332 A | 8/1988 | |
|---|---|---|---|
| JP | 63196332 A * | 8/1988 | ................... 279/2.17 |

(Continued)

OTHER PUBLICATIONS

Extended European Search Report EP Application No. 17158070.7 dated Aug. 7, 2017.

*Primary Examiner* — Rakesh Kumar

(74) *Attorney, Agent, or Firm* — Pillsbury Winthrop Shaw Pittman, LLP

(57) ABSTRACT

A spout holding device for holding a spout part having a communication hole, includes an elastic part capable of elastically deforming in a direction orthogonal to a first direction when compressive force or tensile force is applied to the elastic part in the first direction, wherein the elastic part applies elastic force to the spout part in three or more different directions orthogonal to the first direction to hold the spout part.

6 Claims, 9 Drawing Sheets

(51) Int. Cl.
  *B65D 75/58*  (2006.01)
  *B31B 70/84*  (2017.01)

(56) References Cited

U.S. PATENT DOCUMENTS

| | | | | |
|---|---|---|---|---|
| 4,093,296 A * | 6/1978 | Itoh | ........................ | B65G 47/90 |
| | | | | 294/115 |
| 4,173,368 A * | 11/1979 | Haverbusch | .............. | B66C 1/46 |
| | | | | 294/100 |
| 4,372,598 A * | 2/1983 | Quelch | ................. | B65D 71/50 |
| | | | | 206/145 |
| 4,846,515 A * | 7/1989 | Hall, Sr. | ................. | A63B 47/02 |
| | | | | 294/19.2 |
| 5,029,925 A * | 7/1991 | Rietzler | ............... | B65G 47/908 |
| | | | | 294/100 |
| 5,242,256 A * | 9/1993 | Appel | ..................... | B65B 21/12 |
| | | | | 294/100 |
| 6,371,717 B1 * | 4/2002 | Grams | ................. | B25J 15/0052 |
| | | | | 294/81.61 |
| 7,121,428 B2 * | 10/2006 | Hiramoto | ................ | B31B 70/00 |
| | | | | 221/210 |
| 8,801,068 B2 * | 8/2014 | Goudy | ................. | B65G 47/908 |
| | | | | 294/100 |
| 9,114,897 B2 * | 8/2015 | Kim | ...................... | B65B 43/265 |
| 9,598,192 B2 * | 3/2017 | Yoshikane | ............ | B65B 43/465 |

FOREIGN PATENT DOCUMENTS

| | | | |
|---|---|---|---|
| JP | 2001-260067 A | 9/2001 |
| JP | 2001-341708 A | 12/2001 |
| JP | 2005-059509 A | 3/2005 |
| JP | 2014-076844 A | 5/2014 |
| JP | 2014-080013 A | 5/2014 |

* cited by examiner

SPOUT HOLDING DEVICE, SPOUT SUPPLY MECHANISM, AND SPOUT SEAL MACHINE

CROSS-REFERENCE TO RELATED APPLICATIONS

This application is based upon and claims the benefit of priority from Japanese Patent Application No. 2016-42591, filed on Mar. 4, 2016; the entire contents of which are incorporated herein by reference.

TECHNICAL FIELD

The present invention relates to a spout holding device for holding a spout part, and a spout supply mechanism and a spout seal machine including such a spout holding device.

BACKGROUND ART

Spouted bags (pouches) in which a drink, detergent or the like in the form of liquid or jelly has been sealed up are widely available on the market, and the consumer can discharge the contents of the bag to the outside of the bag via a spout part. Spout seal machines, spouted bag filling packaging machines and spout seal filling packaging machines are known as machines related to such spouted bags.

The spout seal machine is a machine for attaching a spout to an empty bag. With the spout seal machine, the spout is hermetically attached to the bag. Such a spout seal machine is disclosed in Japanese patent application publication No. 2005-59509, for example.

The spouted bag filling packaging machine is a machine for filling a bag to which a spout has been attached (spouted bag) with the contents. The method of filling with the contents is not particularly limited; it is possible to fill the bag with the contents by a method suitable for the forms of the spout and the bag. For example, in cases where it is difficult to fill the bag with the contents via the spout part, such as a case where the spout part has been covered with a cap, it is possible to fill the bag with the contents via a bag mouth formed through the bag and thereafter hermetically seal the spouted bag by sealing up the bag mouth (see Japanese patent application publication No. 2014-76844, for example). In cases where it is easy to fill the bag with the contents via the spout part, such as a case where the spout part has not been covered with a cap, it is possible to fill the bag with the contents via the spout part and thereafter hermetically seal the spouted bag by sealing up the opening of the spout part with a cap or the like (see Japanese patent application publication No. 2001-341708, for example).

The spout seal filling packaging machine is a machine as a combination of the spout seal machine and the spouted bag filling packaging machine explained above. The spout seal filling packaging machine attaches a spout to an empty bag and then fills the bag to which the spout has been attached (spouted bag) with the contents (see Japanese patent application publication No. 2014-80013, for example).

SUMMARY OF INVENTION

Technical Problem

In various types of machines such as those described above, it is common to perform processes like supplying, unloading or handover of the spout or the spouted bag and to hold and transfer the spout part. The process of holding and transferring the spout part is generally performed by pinching the outer peripheral surface of the spout part with a pair of pinching members and applying opposing forces (holding force) from the pair of pinching members to the spout part (see Japanese patent application publication Nos. 2005-59509 and 2014-80013, for example).

However, employing the method of pinching the spout part with a pair of pinching members can be difficult depending on the shape and the material of the spout part.

For example, although employing the method of pinching the spout part with a pair of pinching members requires the spout part to have a part to be pinched by the pair of pinching members, there are cases where the spout part does not have such a part suitable for pinching. A standard type of spout part has a mouth part serving as a spout for drinking or pouring, a flange part formed under the mouth part, and a seal part formed under the flange part. A channel (communication hole) penetrating the mouth part, the flange part and the seal part is formed in many cases. The flange part is a part with which guide members, such as a pair of rails arranged on the upstream side of the transfer process (see "supply rails" in Japanese patent application publication No. 2005-59509, for example) and a pair of pinching members arranged on the downstream side of the transfer process (see "spout pinching members" in Japanese patent application publication No. 2005-59509, for example), engage. The spout or spouted bag is transferred in the state in which the guide members have engaged with the flange part. In the spouted bag, the seal part is arranged inside the bag and bonded to the inner surface of the bag so that the seal part and the bag are sealed (hermetically sealed) together. The spout part having such a typical configuration can be held and transferred by pinching the mouth part with a pair of pinching members from outside, for example.

However, the spout part can take a variety of forms depending on the needs and there also exist spout parts having special shapes, such as a spout part having the flange part and the seal part but not having the mouth part. When such a spout part having no mouth part is used, the spouted bag is hermetically sealed up by bonding a cover member like a film to the top of the flange part and blocking up the channel (communication hole) with the cover member. In the case where the spout part has no mouth part, the "conventional method of pinching the mouth part with a pair of pinching members" cannot be employed. Incidentally, it is practically difficult to grasp the flange part with a pair of pinching members from the outside of the guide members (a pair of rails arranged on the upstream side or a pair of pinching members arranged on the downstream side) since the flange part is the part held by the guide members. On the other hand, it is difficult in the first place to pinch the seal part with a pair of pinching members since the seal part has a special shape (e.g., boat shape in the plan view) in many cases. Further, the seal part is a part bonded to the inner surface of the bag and thus it is practically extremely difficult to insert the seal part into the inside of the bag and bond the seal part directly to the inner surface of the bag while pinching the seal part with a pair of pinching members.

Furthermore, in the method of pinching the spout part with a pair of pinching members, force is applied to the spout part in a particular direction (generally, in opposing directions) only. Thus, strong force locally acts on the spout part and that causes the spout part to be deformed or damaged in cases where rigidity of the spout part is insufficient.

For example, even in the standard type of spout part having the mouth part, there are cases where the mouth part does not have sufficient strength due to a small wall thickness of the mouth part in a tubular shape or softness of the material of the mouth part. In such cases, pinching the mouth part with a pair of pinching members deforms the mouth part (e.g., deformation from a circular cross-sectional shape to an elliptical cross-sectional shape) or damages the outer peripheral surface of the mouth part. Especially in cases where a cap is attached to the mouth part of the spout part, a thread part (e.g., male thread part) may have been formed on the outer peripheral surface of the mouth part. If the thread part is deformed or damaged, defective capping can occur and there is a possibility that the cap cannot be attached to the mouth part or the cap once attached to the mouth part easily comes off from the mouth part.

An object of the present invention, which has been made in consideration of the above-described situation, is to provide a technology that is widely applicable to spout parts having a variety of shapes and makes it possible to properly support the spout part while preventing deformation of the spout part and damage to the spout part.

Solution to Problem

One aspect of the present invention is directed to a spout holding device for holding a spout part having a communication hole, comprising an elastic part capable of elastically deforming in a direction orthogonal to a first direction when compressive force or tensile force is applied to the elastic part in the first direction, wherein the elastic part applies elastic force to the spout part in three or more different directions orthogonal to the first direction to hold the spout part.

Desirably, the spout holding device comprises: a first holding part and a second holding part arranged in line in the first direction in such a manner that the elastic part is arranged between the first holding part and the second holding part; and a clearance adjustment unit capable of moving at least one of the first holding part and the second holding part to change clearance between the first holding part and the second holding part in regard to the first direction, wherein the elastic part elastically deforms in a direction orthogonal to the first direction according to force in the first direction applied by the first holding part and the second holding part, and in a state in which the elastic part and the spout part are arranged side by side in regard to a direction orthogonal to the first direction, the clearance adjustment unit changes the clearance between the first holding part and the second holding part so as to adjust the force in the first direction applied to the elastic part, in such a manner that the elastic part applies the elastic force to the spout part in three or more different directions orthogonal to the first direction.

Desirably, the elastic part elastically deforms at least in a direction orthogonal to the first direction and outward according to the force in the first direction applied by the first holding part and the second holding part, and in a state in which the elastic part is placed in the communication hole of the spout part, the clearance adjustment unit changes the clearance between the first holding part and the second holding part so as to adjust the force in the first direction applied to the elastic part, in such a manner that the elastic part applies the elastic force to a surface of the spout part, the surface forming the communication hole, in three or more different directions orthogonal to the first direction.

Desirably, the spout holding device comprises: a main body member having a push-pull path extending in the first direction and having an external diameter smaller than a diameter of the communication hole of the spout part in regard to a direction orthogonal to the first direction; and a push-pull shaft part provided to penetrate the push-pull path of the main body member and having a large-diameter part that is formed larger than a diameter of the push-pull path in regard to the direction orthogonal to the first direction and is arranged outside the push-pull path of the main body member, wherein the first holding part is formed of the main body member, and the second holding part is formed of the large-diameter part of the push-pull shaft part.

Desirably, the main body member including an elastic body arrangement part that is formed in a tip end part on a large-diameter part side and has an external diameter smaller than external diameters of the first holding part and the second holding part in regard to a direction orthogonal to the first direction, the elastic body arrangement part is arranged between the first holding part and the second holding part in regard to the first direction, at least a part of the elastic part is arranged in a space demarcated by the first holding part, the second holding part and the elastic body arrangement part, and the first holding part and the second holding part apply force to the elastic part in the first direction to compress the elastic part.

Desirably, the elastic part does not protrude from the main body member or the large-diameter part in regard to directions orthogonal to the first direction in a state in which no force in the first direction is applied to the elastic part.

Desirably, the spout holding device comprises: a first drive control unit connected to the main body member and the push-pull shaft part and causing the main body member and the push-pull shaft part to move in the first direction; and a second drive control unit connected to the push-pull shaft part and causing the push-pull shaft part to move with respect to the main body member in regard to the first direction, wherein the clearance adjustment unit is formed of the second drive control unit.

Desirably, the spout holding device comprises: a guide part guiding the main body member in the first direction; and a support frame connected to the first drive control unit and the guide part.

Desirably, the elastic part has a ring-shaped cross section when cut in a direction orthogonal to the first direction and applies the elastic force to a whole circumference of the surface of the spout part forming the communication hole.

Desirably, the elastic part elastically deforms at least in a direction orthogonal to the first direction and inward according to the force in the first direction applied by the first holding part and the second holding part, and in a state in which the elastic part is placed to surround an outer surface of the spout part, the clearance adjustment unit changes the clearance between the first holding part and the second holding part so as to adjust the force in the first direction applied to the elastic part, in such a manner that the elastic part applies the elastic force to the outer surface of the spout part in three or more different directions orthogonal to the first direction.

Desirably, the elastic part has a ring-shaped cross section when cut in a direction orthogonal to the first direction and applies the elastic force to a whole circumference of the outer surface of the spout part.

Desirably, the spout holding device comprises: a projection-shaped body having an outer surface part whose diameter in regard to directions orthogonal to the first direction changes depending on a position in regard to the first direction; and an insertion control unit capable of causing the projection-shaped body to move so as to place a part of the projection-shaped body in the communication hole of the spout part, wherein the elastic part forms at least a part of an outer surface of the projection-shaped body, has a circular or ring-shaped cross section when cut in a direction orthogonal to the first direction, and has a part whose diameter in regard to a direction orthogonal to the first direction is larger than a diameter of the communication hole of the spout part, and the insertion control unit causes the projection-shaped body to move so as to place a part of the projection-shaped body in the communication hole of the spout part, in such a manner that force is applied from the spout part to the elastic part so as to elastically deform the elastic part in a direction orthogonal to the first direction and inward and thereby cause the elastic part to apply the elastic force to the spout part in three or more different directions orthogonal to the first direction.

Desirably, the spout holding device comprises: a recess-shaped body having a recess part whose diameter in regard to a direction orthogonal to the first direction changes depending on a position in regard to the first direction; and an insertion control unit capable of causing the recess-shaped body to move so as to place the spout part in the recess part of the recess-shaped body, wherein the elastic part forms at least a part of a surface of the recess-shaped body, the surface forming the recess part, has a ring-shaped cross section at a part forming the recess part when cut in a direction orthogonal to the first direction, and includes, in the part forming the recess part, a portion whose internal diameter in regard to a direction orthogonal to the first direction is smaller than a diameter of an outer surface of the spout part, and the insertion control unit causes the recess-shaped body to move so as to place at least a part of the spout part in the recess part of the recess-shaped body, in such a manner that force is applied from the spout part to the elastic part so as to elastically deform the elastic part in a direction orthogonal to the first direction and outward and thereby cause the elastic part to apply the elastic force to the spout part in three or more different directions orthogonal to the first direction.

Another aspect of the present invention is directed to a spout supply mechanism comprising: any one of the above-described spout holding devices; and a holding/moving device capable of moving the spout holding device.

Another aspect of the present invention is directed to a spout seal machine comprising the above-described spout supply mechanism.

Another aspect of the present invention is directed to a spout holding method comprising the steps of: arranging an elastic part in a position which faces a spout part in regard to a direction orthogonal to a first direction, the elastic part being capable of elastically deforming in the direction orthogonal to the first direction when compressive force or tensile force is applied to the elastic part in the first direction; and applying compressive force to the elastic part so as to apply elastic force from the elastic part to the spout part in three or more different directions orthogonal to the first direction in such a manner that the spout part is held.

According to the present invention, the spout part is held by applying the elastic force of the elastic part to the spout part in three or more different directions orthogonal to the first direction. Therefore, it is made possible not only to hold spout parts having a variety of shapes but also to properly support the spout part while preventing deformation of the spout part and damage to the spout part.

DESCRIPTION OF EMBODIMENTS

Figure 1:
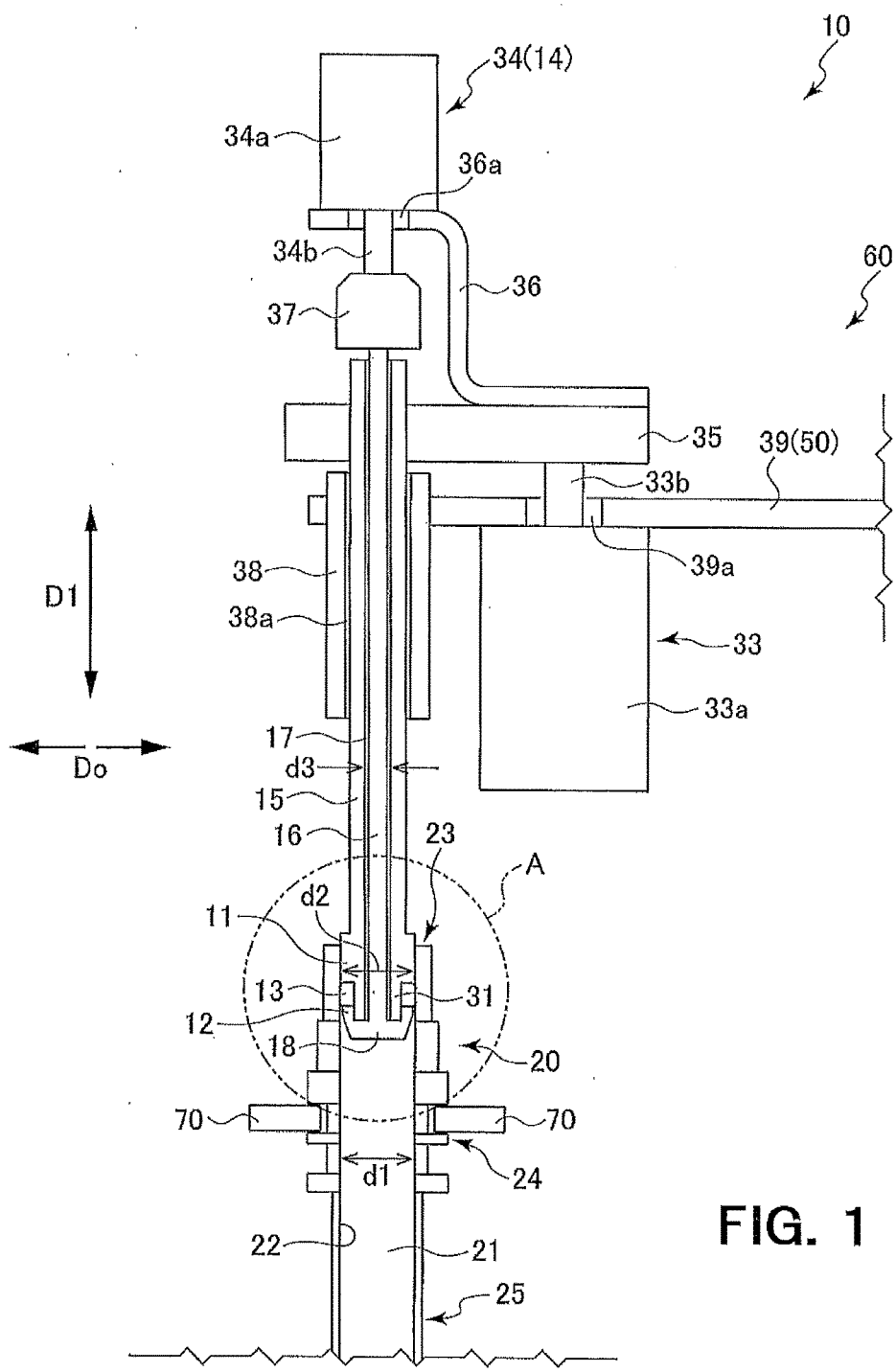
FIG. 1 is a schematic diagram showing a cross section of an example of a spout holding device according to a first embodiment viewed from the side.

Preferred embodiments of the present invention will be described below with reference to drawings.

Spout holding devices according to the following embodiments are devices for holding a spout part. Here, the "spout part" can include a spout alone, a spout to which a bag has been attached, or a spout to which a different accessory has been attached, for example. The spout holding device according to each embodiment includes an elastic part capable of elastically deforming in a direction orthogonal to a first direction when compressive force or tensile force is applied thereto in the first direction. The elastic part holds the spout part by applying elastic force to the spout part in three or more different directions orthogonal to the first direction.

Such spout holding devices are classified into some types with respect to the method of holding the spout part. For example, there is a type of spout holding devices applying compressive force to the elastic part in the first direction and thereby causing elastic force to be applied from the elastic part to the spout part in directions orthogonal to the first direction (hereinafter referred to also as "spout holding devices of the compressive type"). There is also a type of spout holding devices pressing the elastic part directly against the spout part in the first direction and thereby causing elastic force to be applied from the elastic part to the spout part in directions orthogonal to the first direction (hereinafter referred to also as "spout holding devices of the direct pressing type").

In regard to both of the compressive type spout holding devices and the direct pressing type spout holding devices, there is a type of spout holding devices in which the elastic force is applied to an outer peripheral surface (including an edge part) of the spout part (hereinafter referred to also as "spout holding devices of the outer surface holding type"). There is also a type of spout holding devices in which the elastic force is applied to an inner peripheral surface of the spout part (i.e., a surface (including an edge part) forming a communication part provided in the spout part) (hereinafter referred to also as "spout holding devices of the inner surface holding type").

The spout holding devices according to the following first and second embodiments are spout holding devices of the compressive type. The spout holding devices according to the third and fourth embodiments are spout holding devices of the direct pressing type. Specifically, the first embodiment relates to spout holding devices of the compressive type and the inner surface holding type, and the second embodiment relates to spout holding devices of the compressive type and the outer surface holding type. The third embodiment relates to spout holding devices of the direct pressing type and the inner surface holding type, and the fourth embodiment relates to spout holding devices of the direct pressing type and the outer surface holding type.

First Embodiment

Figure 2A:
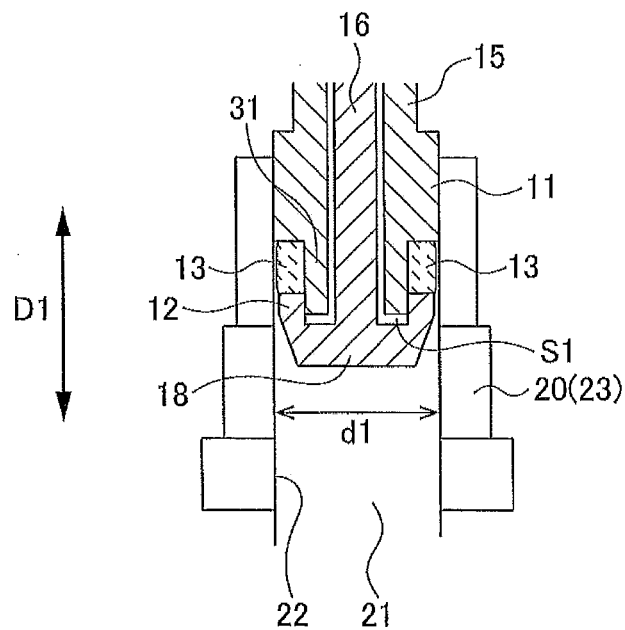
FIG. 2A is an enlarged view of a part indicated by "A" in FIG. 1, showing a state in which no compressive force is applied to an elastic part.
Figure 2B:
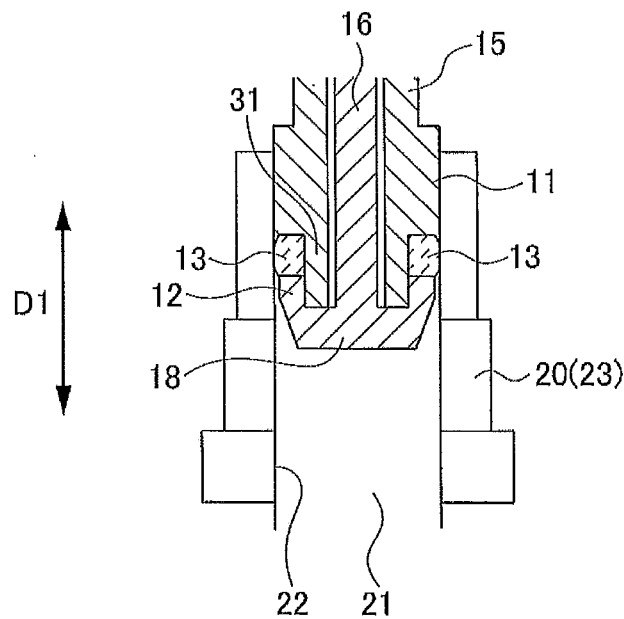
FIG. 2B is an enlarged view of the part indicated by "A" in FIG. 1, showing a state in which compressive force is applied to the elastic part.

FIG. 1 is a schematic diagram showing a cross section of an example of the spout holding device 10 according to the first embodiment viewed from the side. FIG. 2A and FIG. 2B are enlarged views of a part indicated by "A" in FIG. 1, wherein FIG. 2A shows a state in which no compressive force is applied to an elastic part 13, while FIG. 2B shows a state in which compressive force is applied to the elastic part 13.

Incidentally, a "first direction D1" in the following description means the direction of an axis line shown in FIGS. 1 to 2B, which is a concept including not only a "direction heading from one side to the other side" of the axis line but also a "direction heading from the other side to the one side" of the axis line. For example, in FIGS. 1 to 2B, both of the "direction heading from above to below" and the "direction heading from below to above" correspond to the "first direction D1."

The "spout holding device 10 of the compressive type and the inner surface holding type" according to the first embodiment includes a first holding part 11 and a second holding part 12 arranged in line in the first direction D1 and on the same axis line, an elastic part 13 arranged between the first holding part 11 and the second holding part 12, and a clearance adjustment unit 14 capable of changing the clearance between the first holding part 11 and the second holding part 12 in regard to the first direction D1 by moving at least one of the first holding part 11 and the second holding part 12 (the second holding part 12 in the example explained below).

More specifically, the spout holding device 10 includes a tubular main body member 15 having a push-pull path 17 extending in the first direction D1 and a push-pull shaft part 16 arranged to penetrate the push-pull path 17 of the main body member 15. As a whole, the main body member 15 and the push-pull shaft part 16 have rodlike structure extending in the first direction D1. The main body member 15 has an external diameter d2 smaller than the diameter d1 of a communication hole 21 of a spout part 20 (i.e., internal diameter of the spout part 20) in regard to directions orthogonal to the first direction D1. Incidentally, the external diameter of the rodlike main body member 15 may also vary depending on the position. In such cases, at least the external diameter d2 of a part of the main body member 15 inserted into the communication hole 21 of the spout part 20 is smaller than the diameter d1 of the communication hole 21. The push-pull shaft part 16 protrudes from both openings of the push-pull path 17 of the main body member 15. At one end protruding from one of the openings (lower opening in the example of FIGS. 1 to 2B), the push-pull shaft part 16 has a large-diameter part 18 arranged outside the push-pull path 17 of the main body member 15. The large-diameter part 18 is formed to be larger than the diameter d3 of the push-pull path 17 (i.e., internal diameter of the main body member 15) but smaller than the diameter d1 of the communication hole 21 in regard to the directions orthogonal to the first direction D1. For example, the large-diameter part 18 can be formed in a size smaller than or equal to the external diameter d2 of the part of the main body member 15 inserted into the communication hole 21.

In this example, the first holding part 11 is formed of the main body member 15, while the second holding part 12 is formed of the large-diameter part 18 of the push-pull shaft part 16.

The main body member 15 has an elastic body arrangement part 31 formed in the main body member 15's tip end part on the large-diameter part 18's side. The elastic body arrangement part 31 is arranged between the first holding part 11 and the second holding part 12 in regard to the first direction D1. The elastic body arrangement part 31 has an external diameter smaller than the external diameters of the first holding part 11 and the second holding part 12 in regard to the directions orthogonal to the first direction D1.

On the other hand, the spout part 20 includes a mouth part 23 forming one opening part of the communication hole 21, a seal part 25 forming the other opening part of the communication hole 21, and a flange part 24 formed between the mouth part 23 and the seal part 25. The flange part 24 has a step part. The diameter (specifically, external diameter) of the step part in regard to the directions orthogonal to the first direction D1 is smaller than diameters of parts adjoining the step part in the first direction D1. A spout holding member 70 functioning as a guiding member engages with the step part. The spout part 20 is transferred while the step part of the flange part 24 is guided by the spout holding member 70.

The elastic part 13 in this example makes contact with the spout part 20, applies elastic force to the spout part 20, and suspends and holds the spout part 20 mainly with frictional force between the elastic part 13 and the surface (specifically, internal surface) of the spout part 20. Therefore, the elastic part 13 is desired to be formed with a material excelling in elasticity, having flexible surface characteristics, and having a high friction coefficient. For example, the elastic part 13 can be formed desirably with rubber. At least a part of the elastic part 13 is arranged in a space demarcated by the first holding part 11, the second holding part 12 and the elastic body arrangement part 31. To the elastic part 13 arranged in the space, force is applied by the first holding part 11 and the second holding part 12 in the first direction D1 to compress the elastic part 13. The elastic part 13 elastically deforms in the directions orthogonal to the first direction D1 according to the force in the first direction D1 applied by the first holding part 11 and the second holding part 12. In particular, the elastic part 13 according to this embodiment elastically deforms at least in directions orthogonal to the first direction D1 and outward according to the compressive force in the first direction D1 applied by the first holding part 11 and the second holding part 12. Here, the "outward" elastic deformation means deformation in directions of radially separating from the center of the communication hole 21 formed in the spout part 20 to extend in the first direction D1 (see the reference character "$D_O$" in FIG. 1).

Incidentally, the elastic part 13 in this example does not protrude from the main body member 15 (the first holding part 11) or the large-diameter part 18 (the second holding part 12) in regard to the directions orthogonal to the first direction D1 in a state in which no force in the first direction D1 is applied to the elastic part 13 from the first holding part 11 and the second holding part 12. In contrast, when the compressive force in the first direction D1 is applied to the elastic part 13 from the first holding part 11 and the second holding part 12, the elastic part 13 protrudes from the main body member 15 (the first holding part 11) and the large-diameter part 18 (the second holding part 12) in regard to the directions orthogonal to the first direction D1.

Figure 3:
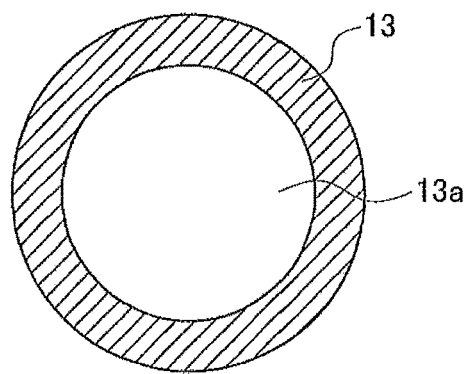
FIG. 3 is a cross-sectional view showing an example of the elastic part according to the first embodiment.

FIG. 3 is a cross-sectional view showing an example of the elastic part 13 according to the first embodiment. FIG. 3 illustrates a cross section of the elastic part 13 obtained by cutting the elastic part 13 in a direction orthogonal to the first direction D1. The elastic part 13 in this example has a tubular shape, with a center bore 13a extending in the first direction D1 and a ring-shaped cross section when cut in a direction orthogonal to the first direction D1. Into the center bore 13a of the elastic part 13, the elastic body arrangement part 31 of the main body member 15 is inserted. In regard to the directions orthogonal to the first direction D1, the diameter of the center bore 13a (i.e., internal diameter of the elastic part 13) is larger than or equal to the diameter (external diameter) of the elastic body arrangement part 31 of the main body member 15 and smaller than the diameters of the first holding part 11 and the second holding part 12. Accordingly, the elastic part 13 is held in the space demarcated by the first holding part 11, the second holding part 12 and the elastic body arrangement part 31, and can be effectively prevented from dropping off from the space. Incidentally, in order to allow the elastic part 13 to efficiently deform in the first direction D1 and outward when the compressive force in regard to the first direction D1 is applied thereto, space between the elastic part 13 and the elastic body arrangement part 31 is desired to be narrow, the diameter of the center bore 13a (i.e., the internal diameter of the elastic part 13) in regard to the directions orthogonal to the first direction D1 is desired to be close to the diameter (external diameter) of the elastic body arrangement part 31, and the diameter of the center bore 13a (i.e., the internal diameter of the elastic part 13) and the diameter (external diameter) of the elastic body arrangement part 31 may also be equal to each other.

As shown in FIG. 1, the spout holding device 10 further includes a first drive control unit 33 connected to the main body member 15 and the push-pull shaft part 16 and a second drive control unit 34 connected to the push-pull shaft part 16. In this example, the first drive control unit 33 (specifically, an elevation shaft part 33b) is connected to the main body member 15 via a first connection member 35, and to the push-pull shaft part 16 via the first connection member 35, a second connection member 36, the second drive control unit 34 and a third connection member 37. Specifically, the first connection member 35 is directly fixed to the second connection member 36. The second drive control unit 34 (specifically, an elevation shaft part 34b) is connected to the push-pull shaft part 16 via the third connection member 37, and the second drive control unit 34 (specifically, a main body part 34a) is connected to the main body member 15 via the second connection member 36 and the first connection member 35. The first drive control unit 33 is capable of moving (elevating and lowering) the main body member 15 and the push-pull shaft part 16 in the first direction D1 by adjusting protrusion length of the elevation shaft part 33b from a main body part 33a. Meanwhile, the second drive control unit 34 is capable of moving (elevating and lowering) the push-pull shaft part 16 in the first direction D1 by adjusting protrusion length of the elevation shaft part 34b from the main body part 34a. Incidentally, the elevation shaft part 33b of the first drive control unit 33 penetrates a through hole 39a formed through a support frame 39 to be able to ascend and descend. Similarly; the elevation shaft part 34b of the second drive control unit 34 penetrates a through hole 36a formed through the second connection member 36 to be able to ascend and descend.

The first and second drive control units 33 and 34 can have any configuration capable of adjusting the protrusion length of the elevation shaft parts 33b and 34b from the main body parts 33a and 34a, respectively, and are typically formed of an air cylinder. As above, an overall position of the main body member 15 and the push-pull shaft part 16 in regard to the first direction D1 is controlled by the first drive control unit 33, while a relative position between the main body member 15 and the push-pull shaft part 16 in regard to the first direction D1 is controlled by the second drive control unit 34. Thus, in this example, the "clearance adjustment unit 14 capable of changing the clearance between the first holding part 11 and the second holding part 12 in regard to the first direction D1" is formed by the second drive control unit 34. Incidentally, the protrusion lengths of the elevation shaft parts 33b and 34b of the first and second drive control units 33 and 34 are properly controlled by an unshown controller or the like.

In the state in which the elastic part 13 and the spout part 20 are arranged side by side in the directions orthogonal to the first direction D1 (the state shown in FIGS. 1 to 2B), the clearance adjustment unit 14 (i.e., the second drive control unit 34) adjusts the force in the first direction D1 applied to the elastic part 13 by changing the clearance between the first holding part 11 and the second holding part 12. This enables the elastic part 13 to apply elastic force to the spout part 20 in three or more different directions orthogonal to the first direction D1. In other words, in the state in which the elastic part 13 is placed in the communication hole 21 of the spout part 20, the clearance adjustment unit 14 adjusts the force (specifically, compressive force) in the first direction D1 applied to the elastic part 13 by changing the clearance between the first holding part 11 and the second holding part 12. This causes the elastic part 13 to make contact with the spout part 20's surface forming the communication hole 21 (i.e., an internal surface 22 of the spout part 20) and apply elastic force to the spout part 20's internal surface 22 forming the communication hole 21 in three or more different directions orthogonal to the first direction D1 (in this example, in all directions orthogonal to the first direction D1).

The spout holding device 10 in this example further includes a guide part 38 for guiding the main body member 15 in the first direction D1 and the support frame 39 connected to the first drive control unit 33 (specifically, the main body part 33*a*) and the guide part 38. The guide part 38 is in a tubular shape, has a through hole 38*a* formed thereinside to extend in the first direction D1, and is directly fixed to the support frame 39. The main body member 15 and the push-pull shaft part 16 penetrate the through hole 38*a* of the guide part 38 and are capable of moving in the first direction D1 relative to the guide part 38. The main body member 15 may slide on the guide part 38's surface (i.e., inner peripheral surface) forming the through hole 38*a*.

The support frame 39 functions not only as a support tool for supporting the first drive control unit 33 (specifically, the main body part 33*a*) and the guide part 38 but also as a holding/moving device 50 capable of moving the entire spout holding device 10 including the first drive control unit 33 and the guide part 38 in a direction orthogonal to the first direction D1 (in this example, a horizontal direction). Specifically, the support frame 39 is formed to be movable in the horizontal direction under drive control by a movement drive source (see a "drive shaft 148" in FIG. 10), and is capable of moving between a prescribed transfer start position and a prescribed transfer end position. A structure including the support frame 39 functioning as the holding/moving device 50 and other components constituting the spout holding device 10 is referred to also as a spout supply mechanism 60. The support frame 39 in this example forms a part of the spout holding device 10 to serve as the support tool, while also forming a part of the spout supply mechanism 60 to serve as the holding/moving device 50.

Next, a method of holding the spout part 20 with the spout holding device 10 (spout holding method) will be described below.

First, the main body member 15 and the push-pull shaft part 16 are moved by the first drive control unit 33 in the first direction D1 and in a direction orthogonal to the first direction D1 and the elastic part 13 is placed at a position facing the mouth part 23 of the spout part 20 in regard to the directions orthogonal to the first direction D1 (placement step). In this embodiment, as shown in FIG. 2A, tip end parts of the main body member 15 and the push-pull shaft part 16 are inserted into the communication hole 21 at the mouth part 23 of the spout part 20, and at least a part of the first holding part 11, the elastic part 13 and the second holding part 12 (the large-diameter part 18) are placed in the communication hole 21. Specifically, the first drive control unit 33 adjusts the protrusion length of the elevation shaft part 33*b* from the main body part 33*a* (in this example, reduces the protrusion length) and thereby moves the main body member 15 and the push-pull shaft part 16 in the first direction D1, by which the tip end parts of the main body member 15 and the push-pull shaft part 16 are moved to enter the communication hole 21. In this placement step, the first holding part 11, the elastic part 13 and the second holding part 12 have diameters smaller than the diameter d1 of the communication hole 21 in regard to the directions orthogonal to the first direction D1, and thus are smoothly inserted into the communication hole 21 without contacting the internal surface 22 of the spout part 20 or while sliding on the internal surface 22.

Incidentally, during the insertion into the communication hole 21, the elastic part 13 may either be compressed in the first direction D1 with force received from the first holding part 11 and the second holding part 12 or not compressed in the first direction D1 with no force received, but has a diameter (external diameter) smaller than the diameter d1 of the communication hole 21. From the viewpoint of smoothly inserting the elastic part 13 into the communication hole 21, outer peripheral surfaces of the first holding part 11 and the second holding part 12 are desired to have the same diameter in regard to the directions orthogonal to the first direction D1, outer peripheral surfaces of the first holding part 11, the elastic part 13 and the second holding part 12 are desired to be formed on the same surface, and the outer peripheral surface of the second holding part 12 may have a smaller diameter than the outer peripheral surface of the elastic part 13 in regard to the directions orthogonal to the first direction D1. Parenthetically, in this example, during the above-described placement step, a space (clearance) S1 is formed between a tip end surface of the main body member 15 (end face of the elastic body arrangement part 31) and the large-diameter part 18, and thus the tip end surface of the main body member 15 and the large-diameter part 18 do not contact each other.

Then, compressive force in the first direction D1 is applied from the first holding part 11 and the second holding part 12 to the elastic part 13, elastic force is applied from the elastic part 13 to the spout part 20 in three or more different directions orthogonal to the first direction D1, and accordingly, the spout part 20 is held by the elastic part 13 (the spout holding device 10) (support step). In this embodiment, as shown in FIG. 2B, the second holding part 12 moves in the first direction D1 to approach the first holding part 11 (i.e., towards the elastic part 13), and the elastic part 13, compressed and flattened in the first direction D1 by the first holding part 11 and the second holding part 12, receives compressive force from the first holding part 11 and the second holding part 12. Specifically, the second drive control unit 34 adjusts the protrusion length of the elevation shaft part 34*b* from the main body part 34*a* (in this example, reduces the protrusion length) and thereby moves the push-pull shaft part 16 in the first direction D1 (specifically, upward in FIGS. 1 to 2B), by which the clearance between the main body member 15 and the push-pull shaft part 16 (i.e., the length of the space demarcated by the first holding part 11, the second holding part 12 and the elastic body arrangement part 31) in regard to the first direction D1 is reduced. Accordingly, the elastic part 13 elastically deforms in the directions orthogonal to the first direction D1 and outward, expands over the first holding part 11 and the second holding part 12 in regard to the directions orthogonal to the first direction D1, makes contact with the internal surface 22 of the spout part 20, applies elastic force to the internal surface 22 in the directions orthogonal to the first direction D1, and holds the spout part 20 with frictional force.

As above, the elastic part 13, which was in the state of not protruding from the first holding part 11 and/or the second holding part 12 in regard to the directions orthogonal to the first direction D1 in the placement step shown in FIG. 2A, protrudes from the first holding part 11 and the second holding part 12 in regard to the directions orthogonal to the first direction D1, closely contacts the internal surface 22 of the spout part 20, and applies frictional force to the spout part 20 in the support step shown in FIG. 2B.

As described above, according to this embodiment, the internal surface 22 of the spout part 20 forming the communication hole 21 is supported based on the elastic deformation and the elastic force of the elastic part 13. Therefore, spout parts 20 in a variety of shapes can be held by the spout holding device 10. Further, the use of the elastic deformation of the elastic part 13 makes it possible to bring the elastic part 13 to close contact with the spout part 20 over a face of the elastic part 13. Furthermore, since elastic force is applied from the elastic part 13 to the spout part 20 in three or more different directions orthogonal to the first direction D1, the spout part 20 can be properly supported with the elastic part 13 while preventing deformation of the spout part 20 and damage to the spout part 20 by effectively avoiding local application of excessive force to the spout part 20.

Especially, according to the spout holding device 10 of this embodiment, the spout part 20 is held by pressing the outer peripheral surface of the elastic part 13 against the spout part 20's internal surface 22 forming the communication hole 21. Therefore, even a spout part 20 in a special shape without the mouth part 23, for example, can be held by the elastic part 13 as long as the spout part 20 has the communication hole 21. Further, the force applied from the spout holding device 10 in this example to the spout part 20 is not the conventional type of force acting in two directions from outside (forces opposing to each other) but force acting from the inside of the spout part 20 in three or more outward radial directions and acting substantially uniformly on the whole circumference of the internal surface 22 of the spout part 20. Specifically, the elastic part 13 has a ring-shaped cross section (see FIG. 3) when cut in a direction orthogonal to the first direction D1 and applies elastic force to the whole circumference of the spout part 20's internal surface 22 forming the communication hole 21. Thus, deformation of the spout part 20 and damage to the spout part 20 can be prevented effectively.

Further, according to the spout holding device 10 of this embodiment, the elastic part 13 is configured as an independent member separate from the main body member 15 and the push-pull shaft part 16. The elastic part 13, as a member repeatedly receiving compressive force, is an expendable item gradually deteriorating along with use and needing replacement. By providing the elastic part 13 separately from the main body member 15 and the push-pull shaft part 16 as in this embodiment, the cost for the replacement of the elastic part 13 can be reduced since replacing the elastic part 13 alone works well when the elastic part 13 has deteriorated. Furthermore, since the elastic part 13 in this embodiment is arranged in the space demarcated by the first holding part 11, the second holding part 12 and the elastic body arrangement part 31, the elastic part 13 can be detached and attached with ease and the replacement of the elastic part 13 can be made quickly and reliably.

Incidentally, while an elastic part 13 having a ring-shaped cross section as shown in FIG. 3 is employed in the above example, the shape of the elastic part 13 is not particularly limited. The elastic part 13 can employ any shape as long as the elastic part 13 having the shape is capable of elastically deforming in directions orthogonal to the first direction D1, making close contact with the internal surface 22 of the spout part 20, applying elastic force to the internal surface 22, and holding the spout part 20 (specifically, the internal surface 22) when receiving compressive force in the first direction D1 from the first holding part 11 and the second holding part 12.

The elastic part 13 in the above example (see FIG. 3) has a ring-shaped cross section, and when compressed in the first direction D1, elastically deforms substantially uniformly in all outward directions in regard to the directions orthogonal to the first direction D1 and is capable of applying substantially uniform elastic force to the spout part 20 (the internal surface 22) in the directions orthogonal to the first direction D1 and outward. In this case, there is an advantage in that the elastic force applied from the elastic part 13 to the spout part 20 is effectively prevented from increasing only in a particular direction and deformation of the spout part 20 and damage to the spout part 20 can be avoided effectively.

Figure 4A:
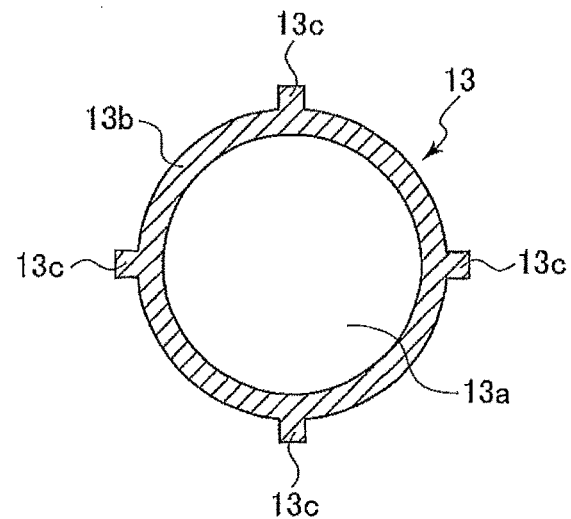
FIG. 4A is a cross-sectional view showing a modification of the elastic part.
Figure 4B:
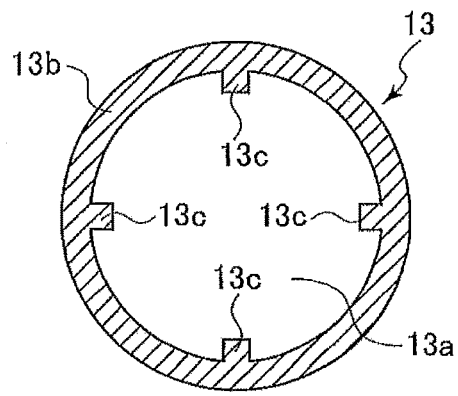
FIG. 4B is a cross-sectional view showing another modification of the elastic part.

FIGS. 4A and 4B are cross-sectional view showing modifications of the elastic part 13. Each of FIGS. 4A and 4B illustrates a cross section of the elastic part 13 obtained by cutting the elastic part 13 in a directions orthogonal to the first direction D1. The elastic part 13 according to the modification shown in FIG. 4A includes a ring-like basal part 13b and at least three or more (four in the example shown in FIG. 4A) projections 13c protruding from the basal part 13b in directions orthogonal to the first direction D1 and outward. The elastic part 13 according to the modification shown in FIG. 4B includes a ring-like basal part 13b and at least three or more (four in the example shown in FIG. 4B) projections 13c protruding from the basal part 13b in directions orthogonal to the first direction D1 and inward (i.e., on the center bore 13a's side).

In the examples shown in FIGS. 4A and 4B, the projections 13c are arranged at positions having point symmetry and line symmetry so that projections 13c adjoining each other in the circumferential direction of the elastic part 13 form an angle of approximately 90 degrees around the center bore 13a. However, the layout positions of the at least three projections 13c are not particularly limited in the above-described elastic parts 13 shown in FIGS. 4A and 4B. From the viewpoint of preventing the force applied by the elastic part 13 to the spout part 20 (the internal surface 22) from being biased in a particular direction, it is desirable to arrange at least three projections 13c at positions having rotational symmetry (including point symmetry) or line symmetry on a cross section of the elastic part 13 obtained by cutting the elastic part 13 in a directions orthogonal to the first direction D1. By forming spaces between the projections 13c as in the elastic parts 13 shown in FIGS. 4A and 4B, a desired elastic deformation amount of the elastic part 13 in the directions orthogonal to the first direction D1 can be secured while reducing the compressive force applied from the first holding part 11 and the second holding part 12 to the elastic part 13.

Second Embodiment

In this embodiment, components identical or corresponding to those in the spout holding device 10 of the above first embodiment are assigned the same reference characters as in the first embodiment and detailed explanation thereof is omitted for brevity.

Figure 5:
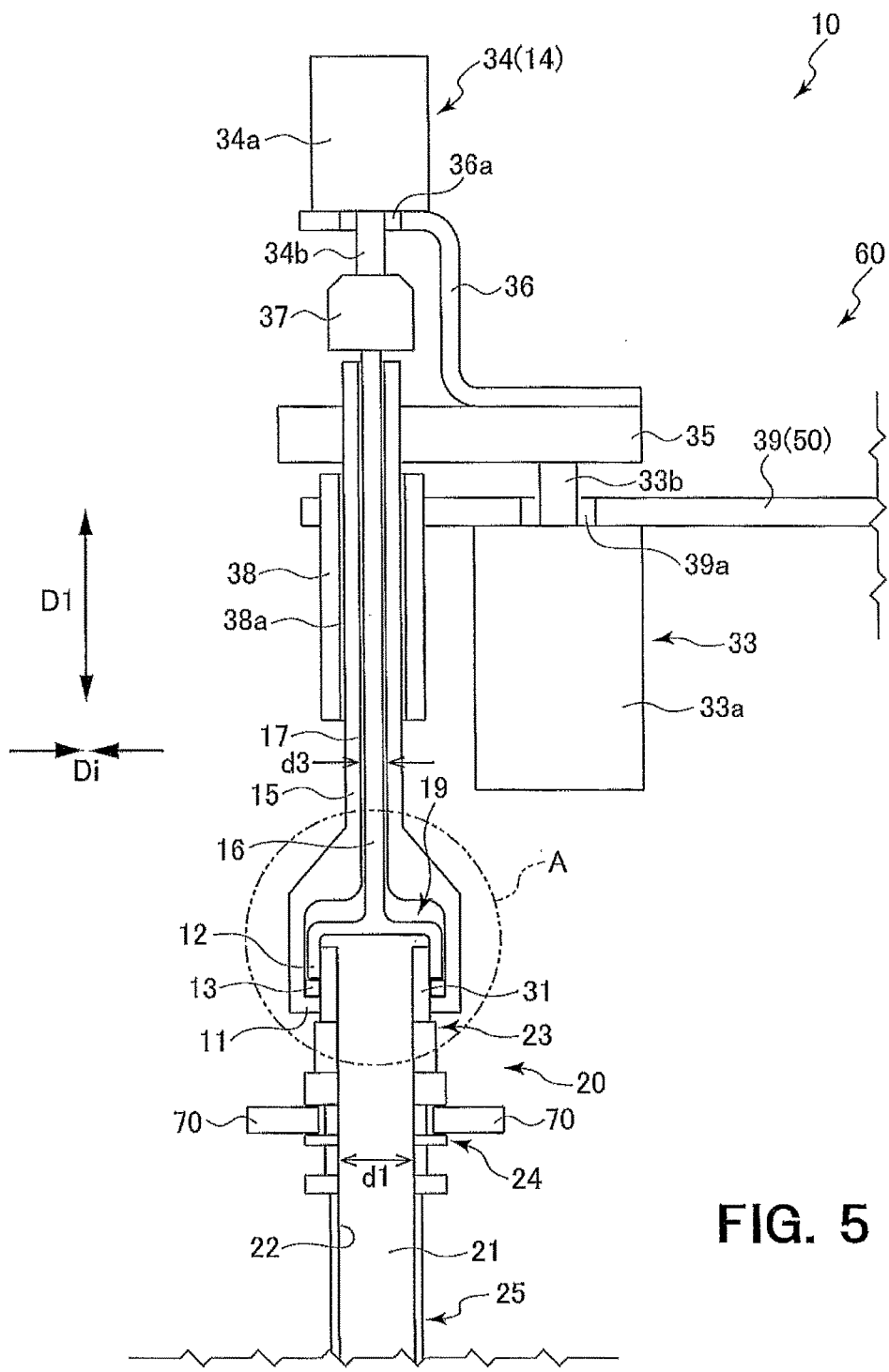
FIG. 5 is a schematic diagram showing a side cross section of an example of a spout holding device according to a second embodiment.
Figure 6A:
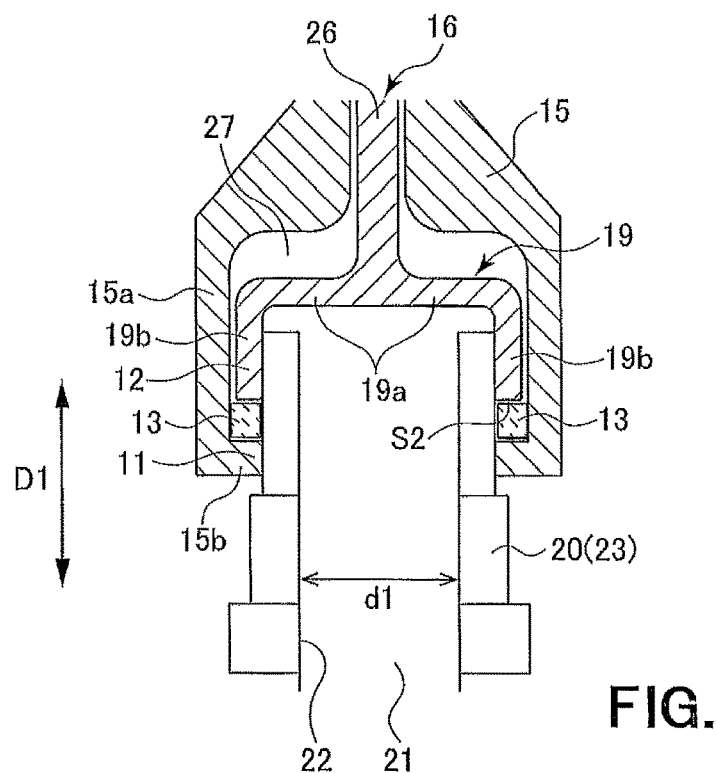
FIG. 6A is an enlarged view of a part indicated by "A" in FIG. 5, showing a state in which no compressive force is applied to an elastic part.
Figure 6B:
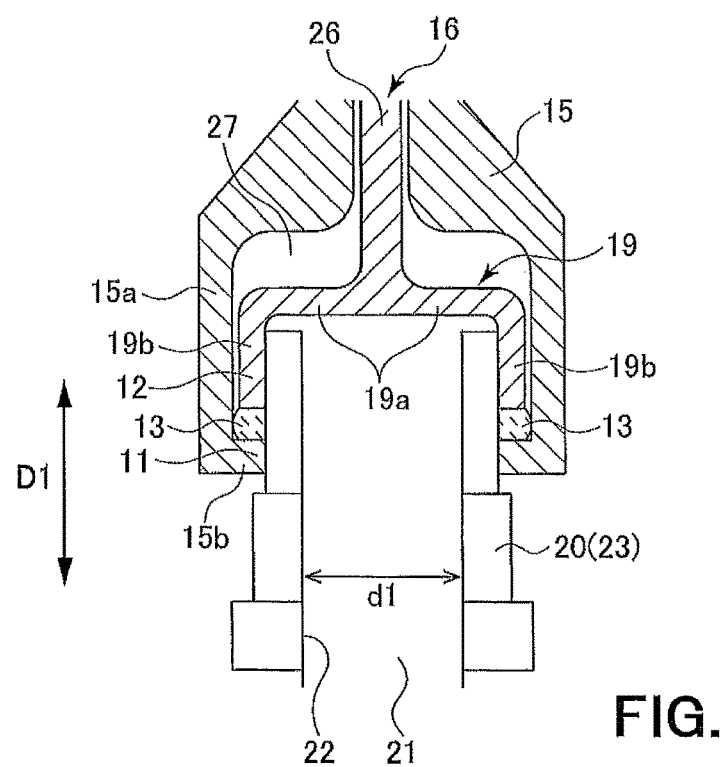
FIG. 6B is an enlarged view of the part indicated by "A" in FIG. 5, showing a state in which compressive force is applied to the elastic part.

FIG. 5 is a schematic diagram showing a side cross section of an example of a spout holding device 10 according to a second embodiment. FIG. 6A and FIG. 6B are enlarged views of a part indicated by "A" in FIG. 5, wherein FIG. 6A shows a state in which no compressive force is applied to an elastic part 13, while FIG. 6B shows a state in which compressive force is applied to the elastic part 13.

While the push-pull shaft part 16 in the above first embodiment has the large-diameter part 18, a push-pull shaft part 16 in this embodiment has a diameter-increasing part 19 instead of the large-diameter part 18. Specifically, at one end protruding from one of the openings (lower opening in the example of FIGS. 5 to 6B) of the push-pull path 17 of the main body member 15, the push-pull shaft part 16 has the diameter-increasing part 19 arranged outside the push-pull path 17. The diameter-increasing part 19 is provided at a tip end part of the push-pull shaft part 16 (a penetrating shaft part 26) penetrating the push-pull path 17 of the main body member 15. The diameter-increasing part 19 includes a disk-shaped enlarging part 19a extending in the directions orthogonal to the first direction D1 and a tubular pressing part 19b extending from a peripheral part of the enlarging part 19a in the first direction D1 to protrude from the push-pull path 17. The internal diameter of the pressing part 19b is larger than or equal to the diameter (external diameter) of a tip end part of the mouth part 23 of the spout part 20.

On the other hand, at an end opposite to the second drive control unit 34, the main body member 15 has a cylindrical side wall part 15a and a ring-like base wall part 15b extending from the tip end of the side wall part 15a in directions orthogonal to the first direction D1. In regard to the directions orthogonal to the first direction D1, the internal diameter of the side wall part 15a is larger than the external diameter of the mouth part 23 of the spout part 20 (specifically, a part receiving the elastic force from the elastic part 13 (the tip end part of the mouth part 23)), larger than the external diameter of the pressing part 19b, and larger than the external diameter of the elastic part 13. On the other hand, the internal diameter of the base wall part 15b is larger than the external diameter of the mouth part 23 of the spout part 20 (specifically, the part receiving the elastic force from the elastic part 13) and smaller than the external diameter of the elastic part 13. Incidentally, the internal diameter of the elastic part 13 is larger than or equal to the diameter (external diameter) of the tip end part of the mouth part 23 of the spout part 20.

The side wall part 15a and the base wall part 15b of the main body member 15 demarcate a cylindrical movable space 27, in which the diameter-increasing part 19 of the push-pull shaft part 16 and the elastic part 13 are arranged. The length of the movable space 27 in regard to the first direction D1 is greater than the sum of the lengths of the diameter-increasing part 19 (the enlarging part 19a and the pressing part 19b) and the elastic part 13, and the diameter-increasing part 19 (push-pull shaft part 16) is movable (reciprocable) in the first direction D1 inside the movable space 27. The elastic part 13, having a ring-like cross section (see FIG. 3), is arranged in the movable space 27 and between the pressing part 19b and the base wall part 15b in regard to the first direction D1. Due to the movement of the push-pull shaft part 16 towards the base wall part 15b, the elastic part 13 is sandwiched between the pressing part 19b and the base wall part 15b and receives compressive force in the first direction D1.

Thus, in this embodiment, the first holding part 11 is formed of the base wall part 15b (the main body member 15), while the second holding part 12 is formed of the pressing part 19b (the diameter-increasing part 19 (the push-pull shaft part 16)). The elastic part 13 according to this embodiment elastically deforms at least in directions orthogonal to the first direction D1 and inward (see arrows in FIG. 5 indicated by the reference character "Di") according to the compressive force in the first direction D1 applied by the first holding part 11 and the second holding part 12.

In the state in which the elastic part 13 is placed to surround the outer surface of the spout part 20, the clearance adjustment unit 14 (i.e., the second drive control unit 34) adjusts the force (specifically, compressive force) in the first direction D1 applied from the first holding part 11 and the second holding part 12 to the elastic part 13 by changing the clearance between the first holding part 11 and the second holding part 12. This causes the elastic part 13 to make contact with the outer surface of the spout part 20 and apply elastic force to the spout part 20 in three or more different directions orthogonal to the first direction D1 (in this example, in all directions orthogonal to the first direction D1).

The rest of the configuration is equivalent to that of the spout holding device 10 according to the above first embodiment.

Also in this embodiment, first, the main body member 15 and the push-pull shaft part 16 are moved by the first drive control unit 33 in the first direction D1 and in a direction orthogonal to the first direction D1 and the elastic part 13 is placed at a position facing the mouth part 23 in regard to the directions orthogonal to the first direction D1 (placement step). However, in this embodiment, as shown in FIG. 6A, the main body member 15 and the push-pull shaft part 16 are arranged so as to surround the outer peripheral surface of the tip end part of the mouth part 23 of the spout part 20 with the push-pull shaft part 16 (specifically, the pressing part 19b), the elastic part 13 and the main body member 15 (specifically, the base wall part 15b). Specifically, the first drive control unit 33 adjusts the protrusion length of the elevation shaft part 33b from the main body part 33a (in this example, reduces the protrusion length) and thereby moves the main body member 15 and the push-pull shaft part 16 in the first direction D1, by which the tip end part of the spout part 20 (the mouth part 23) is caused to enter the inside of the pressing part 19b of the push-pull shaft part 16, the inside of the second holding part 12 (the center bore 13a (see FIG. 3)), the inside of the elastic part 13 (the center bore 13a), and the inside of the base wall part 15b of the main body member 15.

In this placement step, the first holding part 11, the elastic part 13 and the second holding part 12 are desired to have diameters larger than the external diameter of the mouth part 23 of the spout part 20 in regard to the directions orthogonal to the first direction D1. In this case, the mouth part 23 of the spout part 20 can be smoothly inserted into the inside of the first holding part 11, the elastic part 13 and the second holding part 12 without contacting the first holding part 11, the elastic part 13 or the second holding part 12. Parenthetically, in the placement step in this example, a space S2 is formed between the second holding part 12 (i.e., the pressing part 19b) and the elastic part 13, and thus the second holding part 12 and the elastic part 13 do not contact each other and the elastic part 13 receives no compressive force from the first holding part 11 and the second holding part 12.

Then, compressive force is applied to the elastic part 13 in the first direction D1 and elastic force is applied from the elastic part 13 to the spout part 20 in three or more different directions orthogonal to the first direction D1, and accordingly, the spout part 20 is held by the elastic part 13 (the spout holding device 10) (support step). In this embodiment, as shown in FIG. 6B, the second holding part 12 moves in the first direction D1 to approach the first holding part 11 (i.e., towards the elastic part 13), and the elastic part 13, compressed and flattened in the first direction D1 by the first holding part 11 and the second holding part 12, receives compressive force from the first holding part 11 and the second holding part 12. Specifically, the second drive control unit 34 adjusts the protrusion length of the elevation shaft part 34b from the main body part 34a (in this example, increases the protrusion length) and thereby moves the push-pull shaft part 16 in the first direction D1 (specifically, downward in FIGS. 5 to 6B), by which the clearance between the main body member 15 and the push-pull shaft part 16 (i.e., the length of the space demarcated by the first holding part 11, the second holding part 12 and the side wall part 15a) in regard to the first direction D1 is reduced. Accordingly, the elastic part 13 elastically deforms in the directions orthogonal to the first direction D1 and inward, expands over the first holding part 11 and the second holding part 12 in regard to the directions orthogonal to the first direction D1, makes contact with the outer peripheral surface of the spout part 20, applies elastic force to the outer peripheral surface in the directions orthogonal to the first direction D1, and holds the spout part 20 with frictional force.

Thus, the elastic part 13, which was in the state of not protruding from the first holding part 11 and/or the second holding part 12 in regard to the directions orthogonal to the first direction D1 in the placement step shown in FIG. 6A, protrudes from the first holding part 11 and the second holding part 12 in regard to the directions orthogonal to the first direction D1 and closely contacts the outer peripheral surface of the spout part 20 in the support step shown in FIG. 6B.

As described above, according to this embodiment, the outer peripheral surface of the spout part 20 forming the communication hole 21 is supported based on the elastic deformation and the elastic force of the elastic part 13, and thus spout parts 20 in a variety of shapes can be held by the spout holding device 10. Especially, the elastic part 13 in this embodiment has a ring-shaped cross section (see FIG. 3) when cut in a direction orthogonal to the first direction D1 and applies elastic force to the whole circumference of the outer surface of the spout part 20 (specifically, the mouth part 23). Therefore, the spout part 20 can be properly supported with the elastic part 13 while preventing deformation of the spout part 20 and damage to the spout part 20.

Incidentally, the shape of the elastic part 13 according to this embodiment is also not particularly limited and cross-sectional shapes similar to those of the elastic parts 13 in the first embodiment (see FIGS. 3 to 4B, for example) can be employed.

Third Embodiment

In this embodiment, components identical or corresponding to those in the spout holding device 10 of the first embodiment are assigned the same reference characters as in the first embodiment and detailed explanation thereof is omitted for brevity.

Figure 7:
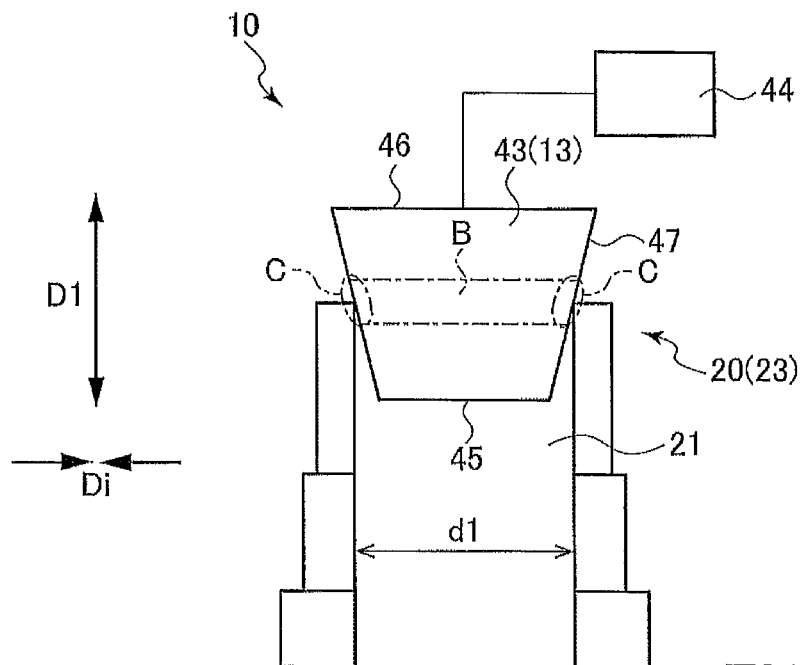
FIG. 7 is a schematic diagram showing a side cross section of an example of a spout holding device according to a third embodiment.

FIG. 7 is a schematic diagram showing a side cross section of an example of a spout holding device 10 according to a third embodiment.

The spout holding device 10 according to this embodiment includes a projection-shaped body 43 having a truncated cone shape and an insertion control unit 44 that moves the projection-shaped body 43 in the first direction D1.

The diameter of an outer surface part (in this example, an outer peripheral surface 47) of the projection-shaped body 43 in regard to the directions orthogonal to the first direction D1 changes depending on the position in regard to the first direction D1. The outer surface of the projection-shaped body 43 in this example includes a tip end surface 45 arranged on the side close to the spout part 20 in regard to the first direction D1 (lower side in FIG. 7), a rear end surface 46 arranged on the side apart from the spout part 20 (upper side in FIG. 7), and an outer peripheral surface 47 connecting outer peripheral edges of the tip end surface 45 and the rear end surface 46. The projection-shaped body 43 in this example has a wedge-like shape whose diameter in the directions orthogonal to the first direction D1 increases continuously from the tip end surface 45 towards the rear end surface 46 (i.e., in regard to the first direction D1). In regard to the directions orthogonal to the first direction D1, the diameter of the tip end surface 45 is smaller than the diameter d1 of the mouth part 23 (specifically, the tip end part) of the spout part 20, while the diameter of the rear end surface 46 is larger than the diameter d1 of the mouth part 23 (specifically, the tip end part) of the spout part 20. Therefore, an end part of the projection-shaped body 43 on the tip end surface 45's side can be smoothly inserted into the communication hole 21 of the mouth part 23 of the spout part 20, whereas a part of the projection-shaped body 43 situated on the rear end surface 46's side of an intermediate part (see the region in FIG. 7 indicated by reference characters "B" and "C") between the tip end surface 45 and the rear end surface 46 is basically not inserted into the communication hole 21. In other words, when the projection-shaped body 43 is inserted into the communication hole 21 of the spout part 20 as shown in FIG. 7, the intermediate part of the projection-shaped body 43 having a diameter equal to or slightly larger than the diameter d1 of the mouth part 23 (specifically, an inner peripheral edge part of the mouth part 23 (i.e., a tip end edge part of the inner peripheral surface of the mouth part 23)) makes contact with the tip end part of the mouth part 23 (the inner peripheral edge part of the mouth part 23) of the spout part 20.

In this example, the whole of the projection-shaped body 43 is formed of the elastic part 13. However, the elastic part 13 according to this embodiment is only required to form at least a part of the outer surface (specifically, the outer peripheral surface 47) of the projection-shaped body 43, have a circular or ring-shaped cross section when cut in a direction orthogonal to the first direction D1, and have a part whose diameter in regard to the directions orthogonal to the first direction D1 is larger than the diameter d1 of the communication hole 21 of the spout part 20. Thus, it is permissible even if only a part of the projection-shaped body 43 is formed of the elastic part 13. For example, it is possible to form only a part of the projection-shaped body 43 whose diameter in regard to the directions orthogonal to the first direction D1 is equal to the diameter d1 of the communication hole 21 of the spout part 20, a part of the projection-shaped body 43 having a diameter slightly larger than the diameter d1 and a part of the projection-shaped body 43 having a diameter slightly smaller than the diameter d1 (see the truncated cone-shaped region in FIG. 7 indicated by the reference character "B") with the elastic part 13. It is also possible to use an elastic part 13 having a ring-shaped cross section so that only a part of the outer surface (specifically, the outer peripheral surface 47) of the projection-shaped body 43 whose diameter in regard to the directions orthogonal to the first direction D1 is equal to the diameter d1 of the communication hole 21 of the spout part 20, a part of the outer surface having a diameter slightly larger than the diameter d1 and a part of the outer surface having a diameter slightly smaller than the diameter d1 (see the outer peripheral surface 47's region in FIG. 7 indicated by the reference character "C") are formed with the elastic part 13.

The insertion control unit 44 is capable of moving the projection-shaped body 43 and thereby placing a part of the projection-shaped body 43 (in this example, a part on the tip end surface 45's side) in the communication hole 21 of the spout part 20. The configuration of the insertion control unit 44 is not particularly limited. The insertion control unit 44 can employ any configuration capable of moving the projection-shaped body 43 in the first direction D1 and properly making the projection-shaped body 43's tip end part on the tip end surface 45's side advance and withdraw into/from the communication hole 21 of the spout part 20.

The rest of the configuration is equivalent to that of the spout holding device 10 according to the first embodiment.

The insertion control unit 44 moves the projection-shaped body 43 to place a part of the projection-shaped body 43 (in this example, the tip end part on the tip end surface 45's side) in the communication hole 21 of the spout part 20, thereby causes force to be applied from the spout part 20 to the projection-shaped body 43 (the elastic part 13), and thereby elastically deforms the projection-shaped body 43 (the elastic part 13) in directions orthogonal to the first direction D1 and inward (see arrows in FIG. 7 indicated by the reference character "Di"). Accordingly, the projection-shaped body 43 (the elastic part 13) applies elastic force to the mouth part 23 (specifically, the inner peripheral edge part) of the spout part 20 in three or more different directions orthogonal to the first direction D1 (in this example, in all directions orthogonal to the first direction D1) and the spout part 20 is held by the projection-shaped body 43 (the elastic part 13).

As described above, according to this embodiment, the spout part 20 can be properly supported while effectively preventing deformation of the spout part 20 and damage to the spout part 20 by use of a simply configured spout holding device 10 (specifically, the projection-shaped body 43). Especially, the spout holding device 10 of this embodiment employs the method of applying force (elastic force) to the inside of the spout part 20 (i.e., the inner peripheral surface forming the communication hole 21) similarly to the spout holding device 10 of the first embodiment, and thus is widely applicable to spout parts 20 in a variety of shapes (e.g., a spout part 20 having no mouth part 23).

Fourth Embodiment

In this embodiment, components identical or corresponding to those in the spout holding device 10 of the first embodiment are assigned the same reference characters as in the first embodiment and detailed explanation thereof is omitted for brevity.

Figure 8:
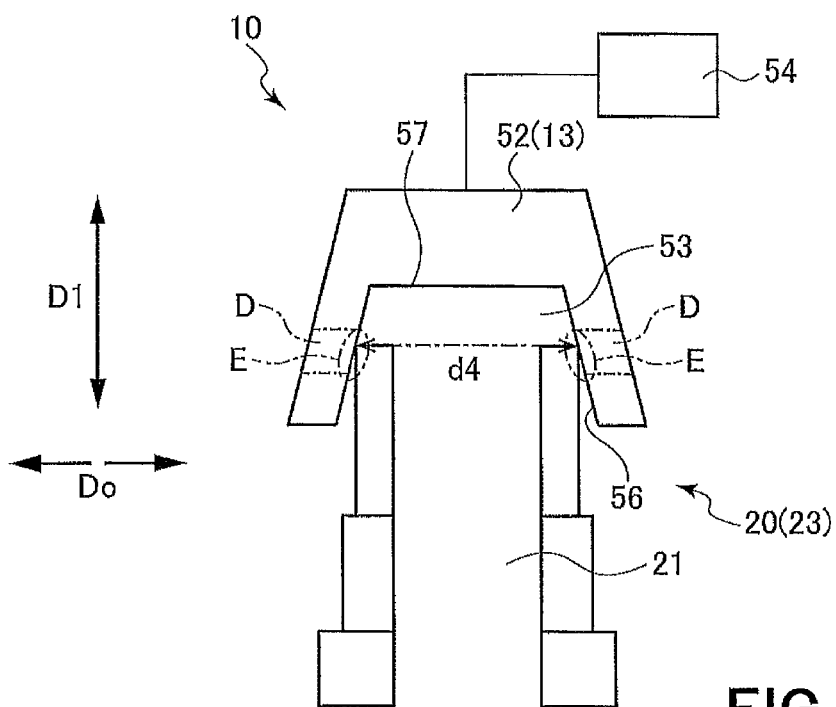
FIG. 8 is a schematic diagram showing a side cross section of an example of a spout holding device according to a fourth embodiment.

FIG. 8 is a schematic diagram showing a side cross section of an example of a spout holding device 10 according to a fourth embodiment.

The spout holding device 10 according to this embodiment includes a recess-shaped body 52 having a recess part 53 whose diameter in regard to the directions orthogonal to the first direction D1 changes depending on the position in regard to the first direction D1 and an insertion control unit 54 capable of moving the recess-shaped body 52 and thereby placing the mouth part 23 (specifically, the tip end part) of the spout part 20 in the recess part 53 of the recess-shaped body 52.

The recess-shaped body 52 in this example has a truncated cone shape. The recess part 53 is a truncated cone-shaped space formed at an end of the recess-shaped body 52 on the spout part 20's side. Specifically, diameters of the recess-shaped body 52 and the recess part 53 in regard to the directions orthogonal to the first direction D1 decrease continuously from the side close to the spout part 20 (lower side in FIG. 8) towards the side apart from the spout part 20 (upper side in FIG. 8) in regard to the first direction D1. In regard to the directions orthogonal to the first direction D1, the diameter of the recess part 53 (i.e., the diameter of an inner peripheral surface 56 (specifically, an inner peripheral edge part) of the recess-shaped body 52) at an end on the side close to the spout part 20 (lower side in FIG. 8) is larger than a diameter (specifically, external diameter) d4 of the mouth part 23 (specifically, the tip end part) of the spout part 20. On the other hand, in regard to the directions orthogonal to the first direction D1, the diameter of the recess part 53 (i.e., the diameter of the inner peripheral surface 56 of the recess-shaped body 52) at an end on the side apart from the spout part 20 (upper side in FIG. 8) is smaller than the diameter (specifically, external diameter) d4 of the mouth part 23 (specifically, the tip end part) of the spout part 20.

Thus, while the tip end part (specifically, the outer peripheral surface) of the mouth part 23 of the spout part 20 can be inserted into the recess part 53 of the recess-shaped body 52, the tip end part of the mouth part 23 of the spout part 20 does not reach the recess-shaped body 52's surface 57 forming the end of the recess part 53 on the side apart from the spout part 20 (upper side in FIG. 8). In other words, when the mouth part 23 of the spout part 20 is inserted into the recess part 53 of the recess-shaped body 52 as shown in FIG. 8, an intermediate part of the recess-shaped body 52's surface (the inner peripheral surface 56) forming the recess part 53, having a diameter equal to or slightly smaller than the external diameter d4 of the mouth part 23 (specifically, an outer peripheral edge part of the mouth part 23 (i.e., a tip end edge part of the outer peripheral surface of the mouth part 23)), makes contact with the tip end part of the mouth part 23 (the outer peripheral edge part of the mouth part 23) of the spout part 20.

In this example, the whole of the recess-shaped body 52 is formed of the elastic part 13. However, the elastic part 13 according to this embodiment is only required to form at least a part of the recess-shaped body 52's surface forming the recess part 53, have a ring-shaped cross section at a part forming the recess part 53 when cut in a direction orthogonal to the first direction D1, and include a portion, in the part forming the recess part 53, whose internal diameter in regard to the directions orthogonal to the first direction D1 is smaller than the diameter of the outer surface of the mouth part 23 of the spout part 20. Thus, it is possible, for example, to form only a part of the recess-shaped body 52 whose internal diameter in regard to the directions orthogonal to the first direction D1 is equal to the external diameter d4 of the mouth part 23 of the spout part 20, a part of the recess-shaped body 52 having an internal diameter slightly larger than the diameter d4 and a part of the recess-shaped body 52 having an internal diameter slightly smaller than the diameter d4 (see the ring-shaped region in FIG. 8 indicated by the reference character "D") with the elastic part 13. It is also possible to use an elastic part 13 having a ring-shaped cross section so that only a part of the inner surface (specifically, the inner peripheral surface 56) of the recess-shaped body 52 whose diameter in regard to the directions orthogonal to the first direction D1 is equal to the external diameter d4 of the mouth part 23 of the spout part 20, a part of the inner surface having a diameter slightly larger than the diameter d4 and a part of the inner surface having a diameter slightly smaller than the diameter d4 (see the inner peripheral surface 56's region in FIG. 8 indicated by the reference character "E") are formed with the elastic part 13.

The insertion control unit 54 is capable of moving the recess-shaped body 52 and thereby placing a part of the spout part 20 (specifically, the tip end part of the mouth part 23) in the recess part 53. The configuration of the insertion control unit 54 is not particularly limited. The insertion control unit 54 can employ any configuration capable of moving the recess-shaped body 52 in the first direction D1 and properly making the tip end part of the spout part 20 advance and withdraw into/from the recess part 53 of the recess-shaped body 52.

The rest of the configuration is equivalent to that of the spout holding device 10 according to the first embodiment.

The insertion control unit 54 moves the recess-shaped body 52 to place at least a part of the spout part 20 (specifically, the tip end part of the mouth part 23) in the recess part 53 of the recess-shaped body 52, thereby causes force to be applied from the mouth part 23 of the spout part 20 (specifically, the outer peripheral edge part of the tip end part) to the recess-shaped body 52 (the elastic part 13), and thereby elastically deforms the recess-shaped body 52 (the elastic part 13) in directions orthogonal to the first direction D1 and outward (see the reference character "Do" in FIG. 8). Accordingly, the recess-shaped body 52 (the elastic part 13) applies elastic force to the mouth part 23 of the spout part 20 in three or more different directions orthogonal to the first direction D1 (in this example, in all directions orthogonal to the first direction D1) and the spout part 20 is held by the recess-shaped body 52 (the elastic part 13).

As described above, according to this embodiment, the spout part 20 can be properly supported while effectively preventing deformation of the spout part 20 and damage to the spout part 20 by use of a simply configured spout holding device 10 (specifically, the recess-shaped body 52).

[Spout Supply Mechanism and Spout Seal Machine]

Examples of a spout supply mechanism and a spout seal machine equipped with the above-described spout holding device 10 will be described below. The spout supply mechanism and the spout seal machine illustrated below have basic configurations described in Japanese patent application publication No. 2005-59509, for example, and include known components, and thus detailed explanation of such known components is omitted properly.

Figure 9:
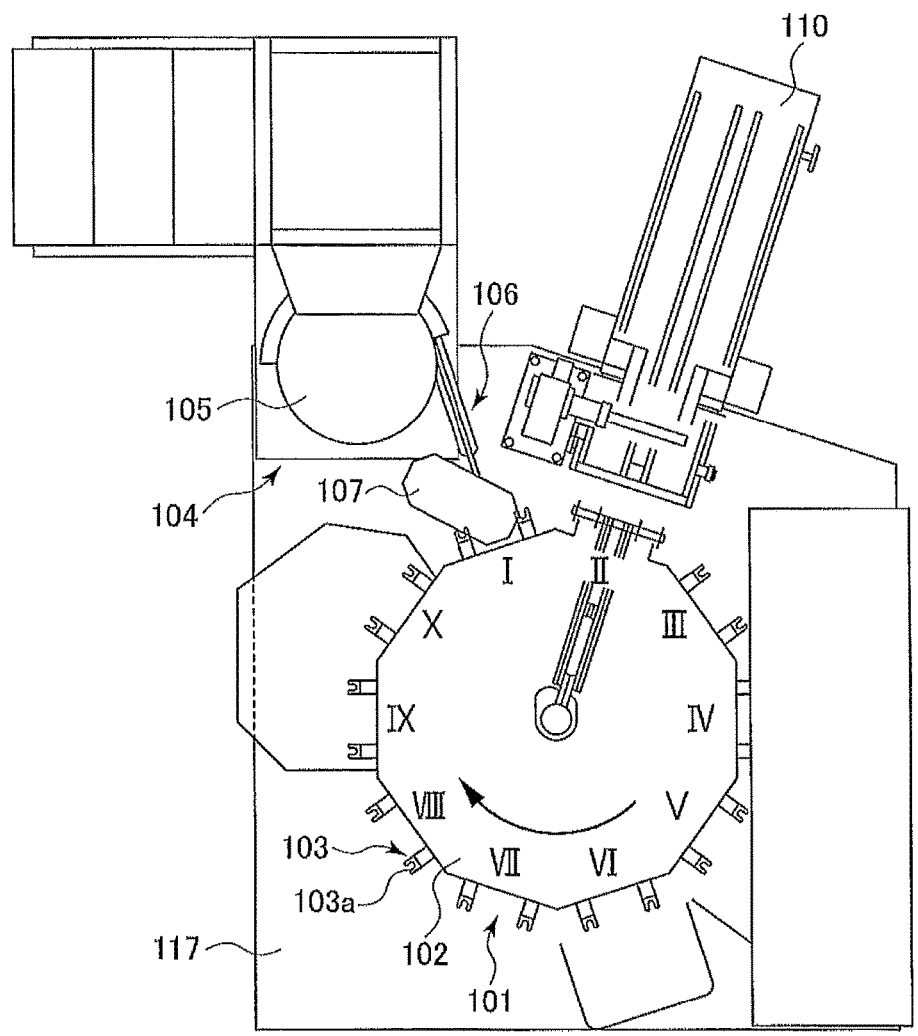
FIG. 9 is a plan view conceptually showing an example of a spout seal machine.

FIG. 9 is a plan view conceptually showing an example of a spout seal machine 101. In the following description, terms indicating directions, such as forward and backward, will be used with reference to the transfer direction of the spout part 20.

The spout seal machine 101 in this example is a W-type spout seal machine 101 that handles two spout parts 20 as a set. In one stoppage of a table 102 in its intermittent rotation, each of two bags is provided with a spout part 20. Various components of the spout seal machine 101 (e.g., the table 102 and a spout transfer positioning device 106) are fixed on a machine base 117.

In a peripheral part of the table 102 in this example, twenty (ten sets of) spout pinching members 103 are arranged. The table 102 stops ten times per rotation. In each stoppage of the table 102, various processes are performed at stopping positions I to X. Specifically, spout supply (stopping position I), bag supply, bag mouth opening and spout placement at the bag mouth (stopping position II), bag positioning and provisional seal (stopping position III), first seal (stopping position IV), second seal (stopping position V), seal part cooling (stopping position VI), date printing (stopping position VII), spout seal part image inspection and date inspection (stopping position VIII), product unloading (stopping position IX), and defective bag ejection (stopping position X) are performed successively.

A pinching notch 103a, into which a spout part 20 will be inserted, is formed in each spout pinching member 103. Each pinching notch 103a extends outward (in the direction of separating from the rotation center of the table 102), the opening of each pinching notch 103a is also pointed outward, and the pinching notches 103a formed in two spout pinching members 103 constituting the same set are oriented in the same direction. The notch width of each pinching notch 103a increases with the increase in the distance from the rotation center of the table 102 and reaches a maximum notch width at the outer tip end of the pinching notch 103a.

A spout supply device 104 for supplying spout parts 20 to a set of (i.e., two) spout pinching members 103 placed at the stopping position I is arranged in the vicinity of the stopping position I. The spout supply device 104 includes a parts feeder 105, a spout transfer positioning device 106 extending from an end part of the parts feeder 105, and a spout handover device 107 arranged between an end part of the spout transfer positioning device 106 and the spout pinching members 103 placed at the stopping position I. A lot of spout parts 20 (in this example, spouts) are successively fed from the parts feeder 105 to the spout transfer positioning device 106, while spout parts 20 are supplied from the spout transfer positioning device 106 to the pinching notches 103a of a pair of spout pinching members 103 placed at the stopping position I via the spout handover device 107.

Incidentally, a conveyer-type magazine device 110 for supplying a bag to each of a set of (i.e., two) spout pinching members 103 placed at the stopping position II is arranged in the vicinity of the stopping position II. After the seal part 25 of a spout part 20 is placed at the bag mouth of each bag at the stopping position II, the seal part 25 is hermetically attached to the bag at the subsequent stopping positions III to IV. Thereafter, the printing process and the printing inspection are performed at the stopping positions VII to VIII. Bags (spouted bags) judged to be normal in the inspection are sent from the stopping position IX to the subsequent stage, while bags (spouted bags) judged to be abnormal in the inspection are ejected from the stopping position X.

Figure 10:
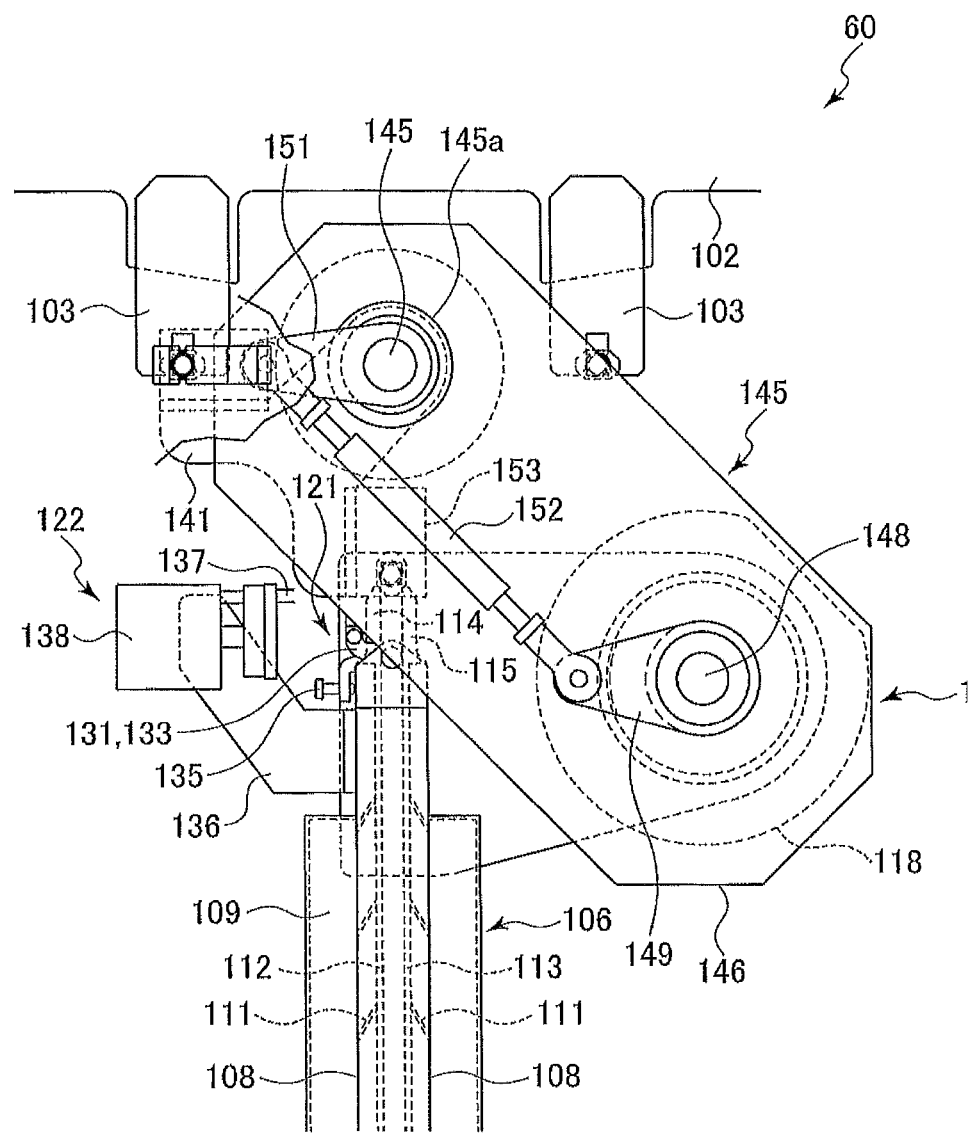
FIG. 10 is a plan view in the vicinity of a spout handover device.
Figure 11:
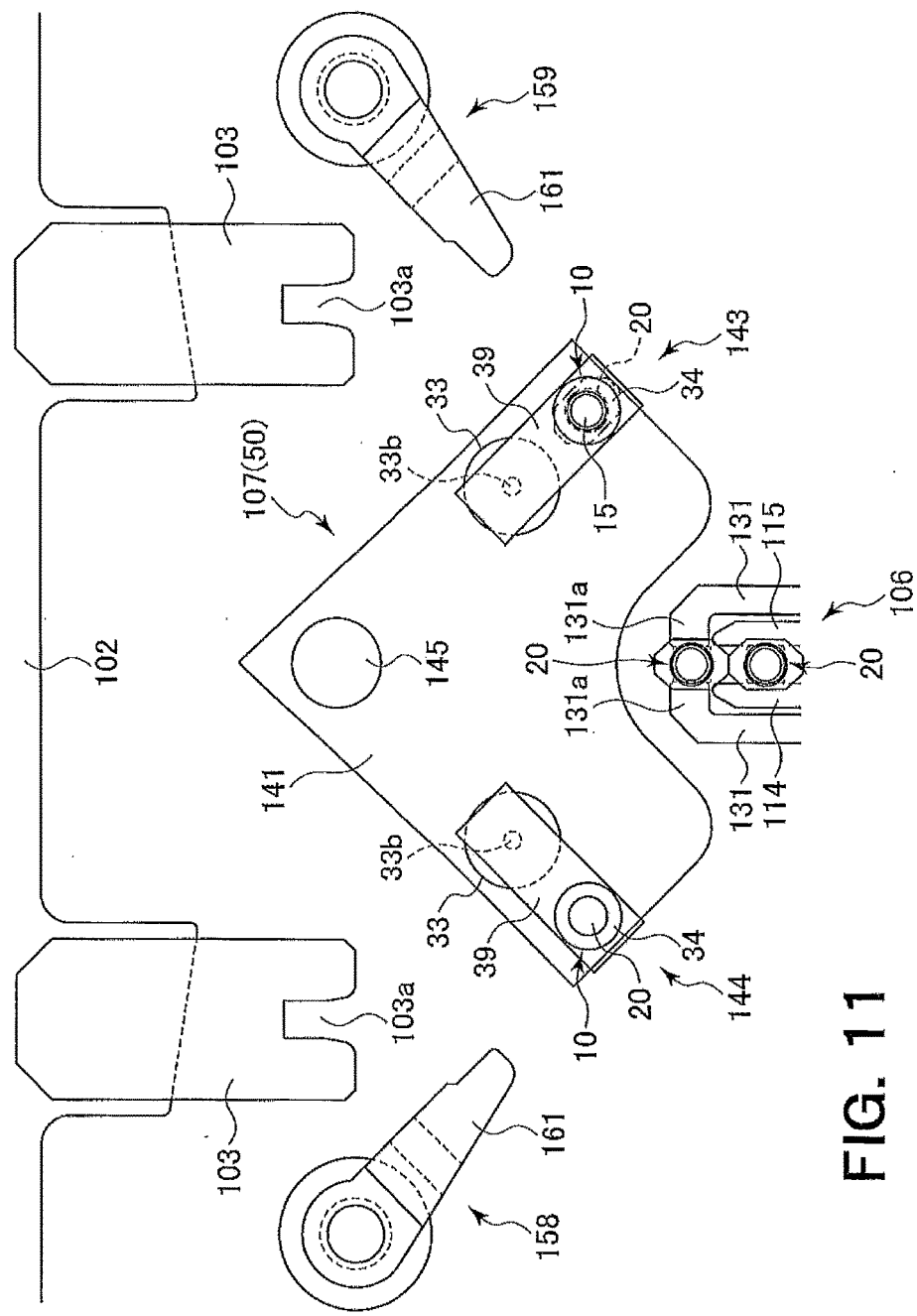
FIG. 11 is a plan view showing the configuration in the vicinity of a reciprocating swing arm.

FIG. 10 is a plan view in the vicinity of the spout handover device 107. FIG. 11 is a plan view showing the configuration in the vicinity of a reciprocating swing arm 141.

The spout transfer positioning device 106 includes two supply rails 108 between which a space for supporting and allowing through the spout parts 20 is formed and aseptic pressurized air passages 109 formed on both sides of the supply rails 108 integrally with the supply rails 108. Nozzles 111 for blowing out aseptic air supplied from the aseptic pressurized air passages 109 are formed through the supply rails 108. Pressurized aseptic air blows out towards the space between the supply rails 108 via the aseptic pressurized air passages 109 and the nozzles 111 and applies forward biasing force to the spout parts 20 supported by the supply rails 108. Support parts 112 and 113 projecting toward each other are formed on internal surfaces of the supply rails 108. The support parts 112 and 113 fit in a groove (the flange part 24) of each spout part 20 and thereby support the spout part 20 in such a manner that the spout part 20 can be transferred forward. Put another way, the spout part 20 (specifically, the flange part 24) is formed to be slidable on the support parts 112 and 113.

The supply rails 108, which is inclined downward in regard to the vertical direction to the vicinity of its front end towards the spout handover device 107, is divided into four regions (first region to fourth region) in its lengthwise direction. While the aseptic pressurized air passages 109 are formed on both sides of the supply rails 108 in the first region, the aseptic pressurized air passage 109 exists on neither side of the supply rails 108 in the second region. The third region has no upper cover part and the supply rails 108 are covered with a pinching device 121 instead of the upper cover part. In the fourth region, only support parts 114 and 115 (extensions of the support parts 112 and 113) to fit in the groove (the flange part 24) of the spout part 20 are formed.

The supply rails 108 are supported by a support member. The support member is fixed to an intermediate flange part that is fixed on a hollow stand 118 stood on the top surface of the machine base 117 of the spout seal machine 101.

The spout transfer positioning device 106 further includes a positioning stopper, the pinching device 121 and a separating device 122 as positioning means for positioning a foremost spout part 20, among the spout parts 20 transferred along the supply rails 108 in a line, at a prescribed position. The front end of the flange part 24 of the foremost spout part 20 makes contact with the positioning stopper.

The pinching device 121 includes an attachment member fixed to the tops of the supply rails 108 in the third region of the supply rails 108, a fulcrum pin fixed vertically to the attachment member, a pair of pinching arms 131 attached to the fulcrum pin so that their rear end parts are rotatable, a tension spring hooked on spring hook parts 133 fixed respectively on the pinching arms 131, and a stopper 135 attached to the rear end of each pinching arm 131. The pinching arms 131 are swingable in a horizontal plane around the fulcrum pin arranged rearward as the fulcrum for the swinging and are biased inward by the tension spring. Thus, the pinching arms 131 are capable of pinching the foremost spout part 20 placed at the prescribed position from both sides, or simply supporting the foremost spout part 20. Incidentally, the stoppers 135 serve for keeping the distance between tip end pinching parts 131a substantially the same as the distance between the support parts 114 and 115.

The separating device 122 is attached to an attachment member 136 fixed to a side face of the supply rails 108. The separating device 122 includes a separation stopper 137 for standing between the foremost spout part 20 and the next spout part 20 and thereby preventing the spout part 20 from protruding forward and an air cylinder 138 for making the separation stopper 137 advance and withdraw in a direction orthogonal to the spout line.

The operation of the spout transfer positioning device 106 will be explained briefly below. The spout parts 20 are supported by the engagement of their grooves (flange parts 24) with the support parts 112 and 113 of the supply rails 108. Then, due to driving force from subsequent spout parts 20, the inclination of the supply rails 108 and the biasing force of the pressurized air from the nozzles 111, the spout parts 20 are transferred forward along the supply rails 108 in a line. The foremost spout part 20 advances forward further from the support parts 114 and 115, enters a gap between the tip end pinching parts 131a of the pair of pinching arms 131, makes contact with the positioning stopper and stops. Incidentally, when the gap between the tip end pinching parts 131a is narrow, there can be cases where the spout part 20 enters between the tip end pinching parts 131a by forcefully widening the gap.

The spout handover device 107 includes the reciprocating swing arm 141 that swings back and forth in a horizontal plane within a swing angle of 90 degrees, a drive mechanism 142 that swings the reciprocating swing arm 141 back and forth, and a pair of holding devices 143 and 144 provided on the reciprocating swing arm 141. The reciprocating swing arm 141, as a member corresponding to the support frame 39 shown in FIG. 1, is fixed to a fulcrum shaft 145 having its center on an extension line from the line of spout parts 20 supported by the supply rails 108. The fulcrum shaft 145 is held by a bearing holder 145a to be rotatable. A support plate 146 is fixed on the upper end of the stand 118, the bearing holder 145a is fixed to the support plate 146, and the fulcrum shaft 145 is supported in the bearing holder 145a to be rotatable. The drive mechanism 142, which is supported in the stand 118, includes a drive shaft 148 that is connected to an unshown drive source and rotates back and forth within a prescribed angular range, a swing lever 149 fixed to the drive shaft 148, a swing lever 151 fixed to the fulcrum shaft 145, and a rod 152 connecting the swing levers 149 and 151 together. According to the rotation of the drive shaft 148, turning force from the drive shaft 148 is transmitted to the reciprocating swing arm 141 via the swing lever 149, the rod 152 and the swing lever 151, and the reciprocating swing arm 141 swings back and forth within the swing angle of 90 degrees.

Each of the holding devices 143 and 144 is equipped with the spout holding device 10. The spout holding device 10 holds a spout part 20 with prescribed timing as described earlier (see the first through fourth embodiments). The spout holding device 10 of each holding device 143, 144 swings around the fulcrum shaft 145 back and forth in a horizontal plane within the swing angle of 90 degrees. The spout holding devices 10 are situated at the same distance from the fulcrum shaft 145 constituting a swing center. An angle made by two straight lines connecting the swing center (the fulcrum shaft 145) and holding centers of the spout holding devices 10 is set at 90 degrees.

When the reciprocating swing arm 141 reaches one end of the reciprocating action, the spout holding device 10 provided on one of the holding devices 143 and 144 receives a spout part 20 from the spout transfer positioning device 106 and holds the spout part 20, while the spout holding device 10 provided on the other one of the holding devices 143 and 144 transfers a spout part 20 to its corresponding spout pinching member. When the reciprocating swing arm 141 reaches the other end of the reciprocating action, the spout holding device 10 provided on the former one of the holding devices 143 and 144 transfers the spout part 20 to its corresponding spout pinching member 103, while the spout holding device 10 provided on the other one of the holding devices 143 and 144 receives a spout part from the spout transfer positioning device 106 and holds the spout part.

The spout supply device 104 further includes a pair of spout tucking devices 158 and 159. The spout tucking devices 158 and 159, provided in the vicinity of a set of (i.e., two) spout pinching members 103 arranged at the stopping position I, include tucking members 161 swingable in a horizontal plane in the vicinity of handover positions and are rotatably supported by support stands stood on the top surface of the machine base 117. Each spout tucking device 158, 159 includes a drive shaft connected to an unshown drive source and rotating back and force within a prescribed angle. The tucking member 161 is fixed on the upper end of the drive shaft. The tucking member 161 swings with prescribed timing and tucks a spout part 20, placed in the vicinity of the mouth of the pinching notch 103a by the spout holding device 10, into the bottom of the pinching notch 103a and thereby makes the spout pinching member 103 securely support the spout part 20.

A sequence of processes in the spout supply device 104 configured as above are carried out via the following steps, for example:

(1) As shown in FIG. 11, for example, the table 102 is stopped and two spout pinching members 103 are stopped at the stopping position I. The reciprocating swing arm 141 is situated at a swing position between the swing ends (intermediate position), with the spout holding device 10 of the holding device 143 holding a spout part 20 and the spout holding device 10 of the holding device 144 holding no spout part 20. In the spout transfer positioning device 106, the foremost spout part 20 is positioned at a reception position and the separation stopper 137 is projecting at that time. Meanwhile, both of the tucking members 161 are situated at withdrawn positions.

(2) Thereafter, according to the rotational driving by the drive shaft 148, the reciprocating swing arm 141 reaches one of the swing ends. The spout holding device 10 of the holding device 143 reaches its handover position, and the spout part 20 held by the spout holding device 10 is tucked into the vicinity of the mouth of the pinching notch 103a of the spout pinching member 103 on the right-hand side in FIG. 11 and supported by the spout pinching member 103. Subsequently, the spout holding device 10 of the holding device 143 releases the spout part 20. On the other hand, the spout holding device 10 of the holding device 144 reaches the reception position, receives a spout part 20 from the spout transfer positioning device 106, and holds the spout part 20. At this stage, the spout part 20 is pinched between the tip end pinching parts 131a of the pinching arms 131. Thereafter, when the reciprocating swing arm 141 starts swinging leftward in FIG. 11 and the spout part 20 held by the spout holding device 10 of the holding device 144 starts moving leftward from the reception position along an arc-like path, one tip end pinching part 131a is pressed by the spout part 20 and the corresponding pinching arm 131 swings leftward together with the spout part 20 against the biasing force of the tension spring. When the spout part 20 has moved for a certain distance and comes off from the tip end pinching parts 131a, the pinching arms 131 return to the original position due to the function of the tension spring. Subsequently, the separation stopper 137 withdraws and the next spout part 20 is pressed forward and positioned at the reception position. Thereafter, the separation stopper 137 advances immediately.

(3) In the state in which the reciprocating swing arm 141 is in the middle of swinging leftward in FIG. 11, the spout holding device 10 of the holding device 143 holds no spout part 20 whereas the spout holding device 10 of the holding device 144 holds a spout part 20. The tucking member 161 of the spout tucking device 159 swings and thereby tucks the spout part 20 positioned at the handover position into the bottom of the pinching notch 103a.

(4) When the reciprocating swing arm 141 reaches the other swing end, the spout holding device 10 of the holding device 143 reaches the reception position and receives and holds the foremost spout part 20 supported by the pair of pinching arms 131. Meanwhile, the spout holding device 10 of the holding device 144 reaches its handover position, tucks the currently held spout part 20 into the vicinity of the mouth of the pinching notch 103a of the spout pinching member 103 on the left-hand side in FIG. 11, and thereby makes the pinching notch 103a hold the spout part 20. Subsequently, the spout holding device 10 of the holding device 144 releases the spout part 20. Thereafter, the reciprocating swing arm 141 swings rightward in FIG. 11, the spout part 20 held by the spout holding device 10 of the holding device 143 moves rightward from the reception position along an arc-like path, and the spout holding device 10 of the holding device 144 also moves rightward. Subsequently, the tucking member 161 of the spout tucking device 158 swings and thereby tucks the spout part 20 positioned at the handover position into the bottom of the pinching notch 103a.

(5) Subsequently, the table 102 rotates in the manner of the intermittent rotation and the next pair of spout pinching members 103 stops at the stopping position I.

Spout parts 20 can be continuously supplied to the spout pinching members 103 by repeating the above-described sequence of processes.

In the following, an example of various processes for holding, moving and releasing a spout part 20 by using a combination of the spout holding device 10 according to the first embodiment and the above-described holding/moving device 50 (e.g., the reciprocating swing arm 141 and the fulcrum shaft 145) will be described.

Standby Step

A spout holding device 10 stays on standby at a position apart from a spout part 20 (standby position). The push-pull shaft part 16 is placed at a position where no compressive force is applied from the first holding part 11 and the second holding part 12 to the elastic part 13 (e.g., end position). The main body member 15, the push-pull shaft part 16 and the elastic part 13 are all placed at a position outside the spout part 20 (transfer start position). The spout part 20 (e.g., a spout alone or a spouted bag) is transferred to a prescribed transfer start position and stops there.

In the example shown in FIGS. 9 to 11, the reciprocating swing arm 141 rotates back and forth (swings) around the fulcrum shaft 145 between a "position where the holding device 143 is close to a spout pinching member 103" and a "position where the holding device 144 is close to a spout pinching member 103" as explained above. When one of the holding devices 143 and 144 is placed at a position close to its corresponding spout pinching member 103, the other one of the holding devices 143 and 144 is placed at a position apart from its corresponding spout pinching member 103 but close to the spout transfer positioning device 106 (spout part 20). Therefore, the standby position, where the spout holding device 10 is placed in this standby step, is desired to be set at a position close to the spout transfer positioning device 106 (spout part 20).

Advancement Step

The first drive control unit 33 advances the elastic part 13 and the tip end parts of the main body member 15 and the push-pull shaft part 16, including the first holding part 11 and the second holding part 12, into the communication hole 21 of the spout part 20.

Holding Step

The second drive control unit 34 moves the push-pull shaft part 16 and thereby compresses the elastic part 13 in its axial direction (the first direction D1) between the first holding part 11 of the main body member 15 and the second holding part 12 of the push-pull shaft part 16 (a rear end surface of the large-diameter part 18). Accordingly, in regard to the directions orthogonal to the first direction D1, the elastic part 13 elastically deforms in such a manner that its outer peripheral part (external diameter part) bulges out in its radial directions over the main body member 15 (the first holding part 11). In a state in which the push-pull shaft part 16 has reached its withdrawal end, the outer peripheral part of the elastic part 13 makes close contact with the spout part 20's internal surface 22 forming the inner peripheral surface of the channel and elastic force is applied from the elastic part 13 to the internal surface 22. Due to the elastic force (frictional force) applied from the elastic part 13 to the spout part 20 as above, the spout part 20 is held by the spout holding device 10 (specifically, the elastic part 13).

In the example shown in FIGS. 9 to 11, the foremost spout part 20 staying on standby in the spout transfer positioning device 106 (a spout part 20 grasped by the pair of tip end pinching parts 131a) is held by the spout holding device 10 of the holding device 143 or 144.

Transfer Step

In the state in which the spout holding device 10 is holding the spout part 20, the holding/moving device 50 moves the spout holding device 10 and the spout part 20.

In the example shown in FIGS. 9 to 11, the reciprocating swing arm 141 swings around the fulcrum shaft 145 and the spout holding device 10 of one of the holding devices 143 and 144, in the state of holding the spout part 20, moves from the position in the vicinity of the spout transfer positioning device 106 (the transfer start position) to the position in the vicinity of the pinching notch 103a of the corresponding spout pinching member 103 (the transfer end position), by which the spout part 20 is placed in the pinching notch 103a of the corresponding spout pinching member 103. On the other hand, the spout holding device 10 of the other one of the holding devices 143 and 144, in the state of holding no spout part 20, moves from the position in the vicinity of the pinching notch 103a of the corresponding spout pinching member 103 (the transfer end position) to the position in the vicinity of the spout transfer positioning device 106 (the transfer start position).

Release Step

In the state in which the spout holding device 10 has moved to the transfer end position and the spout part 20 has been placed in the pinching notch 103a of the corresponding spout pinching member 103, the second drive control unit 34 moves the push-pull shaft part 16 so as to widen the clearance between the first holding part 11 and the second holding part 12. Accordingly, the compressive force applied from the first holding part 11 and the second holding part 12 to the elastic part 13 decreases gradually, and eventually, the push-pull shaft part 16 (specifically, the large-diameter part 18 (the second holding part 12)) moves to a position where no compressive force is applied from the first holding part 11 and the second holding part 12 to the elastic part 13. Consequently, the spout part 20 is released from the spout holding device 10 (specifically, the elastic part 13).

Thereafter, the elastic part 13, the main body member 15 and the push-pull shaft part 16 (specifically, the first holding part 11 and the second holding part 12) are pulled out from the communication hole 21 of the spout part 20 and placed outside the spout part 20 by the first drive control unit 33.

Return Step

The spout holding device 10 is returned to the aforementioned standby position (the position close to the spout transfer positioning device 106 (spout part 20)).

In the example shown in FIGS. 9 to 11, the reciprocating swing arm 141 swings around the fulcrum shaft 145 and the spout holding device 10 that has released the spout part 20, in the state of holding no spout part 20, moves from the position in the vicinity of the pinching notch 103a of the corresponding spout pinching member 103 (the transfer end position) to the position in the vicinity of the spout transfer positioning device 106 (the transfer start position). This allows the spout holding device 10 to receive a new spout part 20 from the spout transfer positioning device 106.

As described above, in the above example, the holding/moving device 50 capable of moving the spout holding device 10 includes the reciprocating swing arm 141 and the fulcrum shaft 145, and a drive control unit of the holding/moving device 50 includes the swing lever 151, the rod 152, the swing lever 149 and the drive shaft 148. The spout supply mechanism 60 includes such a holding/moving device 50 and the spout holding device 10. The spout seal machine 101 includes various devices such as the spout supply mechanism 60 shown in FIGS. 9 to 11.

Incidentally, in the above example, the "swing angle of the reciprocating swing arm 141" and the "angle made by two straight lines connecting the swing center of the reciprocating swing arm 141 and the two spout holding devices 10 (holding centers)" are set at 90 degrees since opening directions of the pinching notches 103a of the two spout pinching members 103 constituting the same set are the same as each other. If the pinching notches 103a of the two spout pinching members 103 constituting the same set are both oriented in radial directions of the table 102, for example, the "swing angle of the reciprocating swing arm 141" and the "angle made by two straight lines connecting the swing center of the reciprocating swing arm 141 and the two spout holding devices 10 (holding centers)" are set slightly larger than 90 degrees.

The present invention is not limited to the above-described embodiments and modifications but can contain a variety of modes obtained by various modifications conceivable by those skilled in the art, and effects achieved by the present invention are also not limited to those described above. Thus, various additions, changes and partial deletions can be made to elements described in the claims and this description within the range not departing from the technical idea and content of the present invention.

The invention claimed is:

1. A spout holding device for holding a spout part having a communication hole, comprising
    an elastic part configured to elastically deform in a direction orthogonal to a first direction when a compressive force or tensile force is applied to the elastic part in the first direction,
    wherein the elastic part is configured to apply elastic force to the spout part in three or more different directions orthogonal to the first direction to hold the spout part,
    a first holding part and a second holding part arranged in line in the first direction such that the elastic part is arranged between the first holding part and the second holding part;
    a clearance adjustment unit configured to move at least one of the first holding part and the second holding part to change clearance between the first holding part and the second holding part in regard to the first direction,
    wherein the elastic part is configured to elastically deform at least in the direction orthogonal to the first direction and an outward direction according to the compressive or tensile force in the first direction applied by the first holding part and the second holding part,
    wherein, when the elastic part is placed in the communication hole of the spout part, the clearance adjustment unit is configured to change the clearance between the first holding part and the second holding part so as to adjust the compressive or tensile force in the first direction applied to the elastic part, such that the elastic part is configured to apply the elastic force to a surface of the spout part, the surface forming the communication hole, in the three or more different directions orthogonal to the first direction,
    a main body member having a push-pull path extending in the first direction and having an external diameter smaller than a diameter of the communication hole of the spout part in regard to the direction orthogonal to the first direction; and
    a push-pull shaft part provided to penetrate the push-pull path of the main body member and having a large-diameter part that is formed larger than a diameter of the push-pull path in regard to the direction orthogonal to the first direction and is arranged outside the push-pull path of the main body member,
    wherein the first holding part is formed of the main body member,
    wherein the second holding part is formed of the large-diameter part of the push-pull shaft part, wherein the main body member including an elastic body arrangement part that is formed in a tip end part on a large-diameter part side and has an external diameter smaller than external diameters of the first holding part and the second holding part in regard to the direction orthogonal to the first direction, wherein the elastic body arrangement part is arranged between the first holding part and the second holding part in regard to the first direction, wherein at least a part of the elastic part is arranged in a space demarcated by the first holding part, the second holding part and the elastic body arrangement part, and wherein the first holding part and the second holding part apply the compressive or tensile force to the elastic part in the first direction to compress the elastic part.

2. The spout holding device according to claim 1, wherein the elastic part does not protrude from the main body member or the large-diameter part in regard to the directions orthogonal to the first direction when no force in the first direction is applied to the elastic part.

3. The spout holding device according to claim 2, further comprising:
a first drive control unit connected to the main body member and the push-pull shaft part and causing the main body member and the push-pull shaft part to move in the first direction; and
a second drive control unit connected to the push-pull shaft part and causing the push-pull shaft part to move with respect to the main body member in regard to the first direction, wherein the clearance adjustment unit is formed of the second drive control unit.

4. The spout holding device according to claim 1, further comprising:
a first drive control unit connected to the main body member and the push-pull shaft part and causing the main body member and the push-pull shaft part to move in the first direction; and
a second drive control unit connected to the push-pull shaft part and causing the push-pull shaft part to move with respect to the main body member in regard to the first direction, wherein the clearance adjustment unit is formed of the second drive control unit.

5. A spout supply mechanism comprising:
the spout holding device according to claim 1; and
a holding/moving device configured to move the spout holding device.

6. A spout seal machine comprising:
the spout supply mechanism according to claim 5.

* * * * *